US010162881B2

(12) United States Patent
Mackay et al.

(10) Patent No.: US 10,162,881 B2
(45) Date of Patent: Dec. 25, 2018

(54) MACHINE-ASSISTED KEY DISCOVERY AND JOIN GENERATION

(71) Applicant: Maana, Inc., Palo Alto, CA (US)

(72) Inventors: Jason Forrest Mackay, Sammamish, WA (US); Field Nicholas Cady, Redmond, WA (US); Alexander Hussam Elkholy, Seattle, WA (US); Robert Povey, Redmond, WA (US); Tara Sanathanan Prakriya, Redmond, WA (US); Ralph Donald Thompson, III, Sammamish, WA (US); Ryan Allen Kirk, Seattle, WA (US)

(73) Assignee: Maana, Inc., Palo Alto, CA (US)

( * ) Notice: Subject to any disclaimer, the term of this patent is extended or adjusted under 35 U.S.C. 154(b) by 0 days.

(21) Appl. No.: 15/408,337

(22) Filed: Jan. 17, 2017

(65) Prior Publication Data

US 2018/0203919 A1    Jul. 19, 2018

(51) Int. Cl.
*G06F 17/30* (2006.01)
(52) U.S. Cl.
CPC .. *G06F 17/30604* (2013.01); *G06F 17/30324* (2013.01)
(58) Field of Classification Search
None
See application file for complete search history.

(56) References Cited

U.S. PATENT DOCUMENTS

| | | | | |
|---|---|---|---|---|
| 9,378,303 | B1* | 6/2016 | Shankar | G06F 17/30958 |
| 2005/0055369 | A1* | 3/2005 | Gorelik | G06F 17/30292 |
| 2006/0026189 | A1* | 2/2006 | Djugash | G06F 17/30569 |
| 2006/0106825 | A1* | 5/2006 | Cozzi | G06F 17/30604 |
| 2007/0050381 | A1* | 3/2007 | Hu | G06F 17/30324 |
| 2010/0313157 | A1* | 12/2010 | Carlsson | G06F 17/30604 715/769 |
| 2014/0108433 | A1* | 4/2014 | Conner | G06F 17/30327 707/752 |
| 2015/0379085 | A1* | 12/2015 | Petculescu | G06F 17/30339 707/714 |

(Continued)

OTHER PUBLICATIONS

Bahmani, A.H., et al., Automatic Database Normalization and Primary Key Generation, CCECE/CCGEI, Niagara Falls, Canada, May 5-7, 2008, 6 pages.

(Continued)

*Primary Examiner* — Neveen Abel Jalil
*Assistant Examiner* — Katriel Y Chiu
(74) *Attorney, Agent, or Firm* — John W. Branch; Lowe Graham Jones PLLC

(57) ABSTRACT

Embodiments are directed towards managing data. Attributes of model fields of a plurality of model objects may be analyzed. If the analysis of the attributes discovers primary key fields in the model objects, the characteristics of the primary keys may be compared with the characteristics of other model objects. If affirmative results of the comparison indicate that one or more foreign key fields may be in the other model objects, one or more relationships that associate the primary key fields with the foreign key fields may be provided. And, a system model may be provided based on the relationships and the model objects that include the primary key fields and the model objects that include the foreign key fields.

30 Claims, 15 Drawing Sheets

(56) References Cited

U.S. PATENT DOCUMENTS

| | | | | |
|---|---|---|---|---|
| 2016/0034486 A1* | 2/2016 | Dageville | ......... | G06F 17/30132 |
| | | | | 707/747 |
| 2016/0179930 A1* | 6/2016 | Radivojevic | .......... | G06F 3/0482 |
| | | | | 707/792 |
| 2016/0335302 A1* | 11/2016 | Teodorescu | ....... | G06F 17/30368 |
| 2017/0034018 A1* | 2/2017 | Parandehgheibi | .. | H04L 63/1425 |

OTHER PUBLICATIONS

Chattopadhyay, I., et al., Data Smashing. Discovery Informatics Papers, AAAI, Cornell University, Ithaca, New York, 2014, 8 pages.

Ilyas, I., et al., Automatic Relationship Discovery in Self-Managing Database Systems, Proceedings of the International Conference on Autonomic Computing, 2004, 2 pages.

Heule, S., et al., A. HyperLogLog in Practice: Algorithmic Engineering of a State of the Art Cardinality Estimation Algorithm, EDBT/ICDT, Genoa, Italy, Mar. 13-22, 2013, 10 pages.

Marcus, R., et al., An Efficient Algorithm and Monte Carlo Methods for Inferring Functional Dependencies, Doctoral Defense, Department of Philosophy, University of Arizona, May 26, 2014, 11 pages.

Pascoe, A., HyperLogLog and Minhash: A Union for Intersections, AdRoll, Apr. 25, 2013, 37 pages.

Sailhan, F., et al., Folding and Unfolding Bloom Filters—An off-Line Planning and on-Line Optimisation, IEEE, SRI International, Menlo Park, California, 2012, 8 pages.

Salikhov, K., et al., Using Cascading Bloom Filters to Improve the Memory Usage for de Brujin Graphs, 2013, 13 pages.

* cited by examiner

MACHINE-ASSISTED KEY DISCOVERY AND JOIN GENERATION

TECHNICAL FIELD

This invention relates generally to information organization and data modeling and more particularly, to characterizing data objects for searching and analysis.

BACKGROUND

Organizations are generating and collecting an ever increasing amount of data. Data may be directly or indirectly generated from disparate parts of the organization, such as, consumer activity, manufacturing activity, customer service, quality assurance, or the like. For various reasons, it may be inconvenient for such organizations to effectively utilize their vast collections of data. In some cases the sheer quantity of data may make it difficult to effectively utilize the collected data to improve business practices. In other cases, the data collected by different parts of an organization may be stored in different formats, or stored in different locations. Further, employees within the organization may not be aware of the purpose or content of the various data collections stored throughout the organization. Accordingly, it may be difficult to discover relevant relationships between portions of the data collections. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
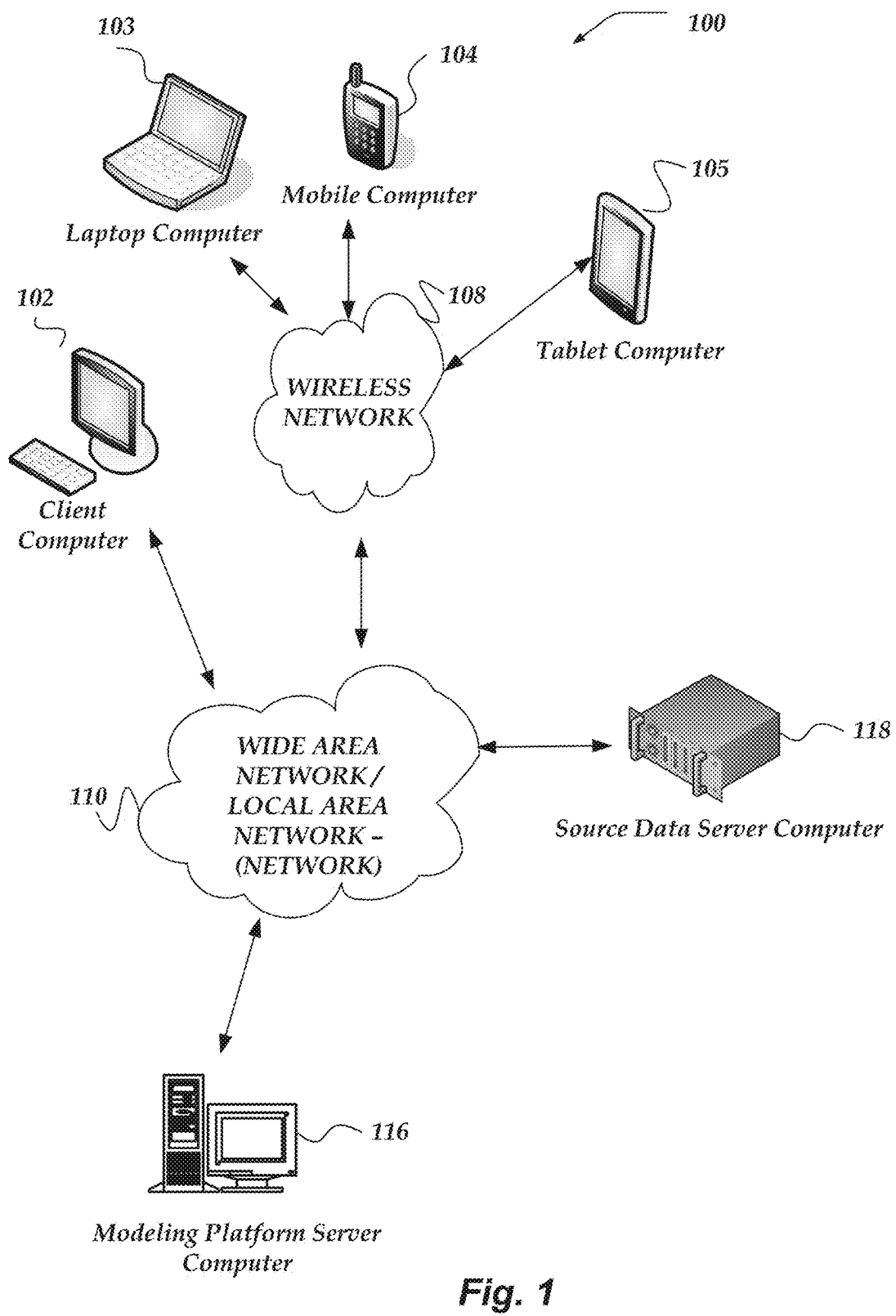
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein "data-type" refers to a type designation for the type of content of a raw field value. Typical examples may include, string, numeric, date-time, text, images, time-date, video, location (geo-spatial), or the like. A data-type may be included in the attribute information associated with model object fields.

As used herein, the terms "raw data set," or "data set" refer to data sets provided by an organization that may represent the items to be included in a system model. In some embodiments raw data may be provided in various formats. In simple cases, raw data may be provided in spreadsheets, databases, csv files, or the like. In other cases, raw data may be provided using structured XML files, tabular formats, JSON files, models information from one or more other system models, or the like. In one or more of the various embodiments, raw data in this context may be the product one or more preprocessing operations. For example, one or more pre-processing operations may be executed on information, such as, log files, data dumps, event logs, database dumps, unstructured data, structured data, or the like, or combination thereof. In some cases, the pre-processing may include data cleansing, filtering, or the like. The pre-processing operations, if any, may occur before the information may be considered to be raw data. The particular pre-processing operations may be specialized based on the source, context, format, veracity of the information, access opportunities, or the like. In most cases, raw data may be arranged such that it may be logically viewed as comprising one or more objects, tables, having one or more identifiable fields and/or columns, or the like.

As used herein, the terms "raw data objects," or "data objects" refer to objects or tables that comprise raw datasets. For example, if a dataset is comprised of a plurality of tabular record set, the separate tabular record sets may be consider data objects. A data object may be arranged to include one or more records having one or more fields.

As used herein, the term "model object" refers to an object that models various characteristics of a data object. Model objects may include one or more model object fields that include one or more attributes (e.g., model field attributes) that represent features or characteristics of their corresponding data object fields. Accordingly, while a data object may have thousands or millions of records, its corresponding model object may be arranged to include model object fields that include attributes describing one or more characteristics of their underlying data object fields rather than thousands or millions of records.

As used herein, the terms "primary key," or "primary key field" refer a field of a data object (e.g., a column in a table) where each value for that field is unique within a given data object. Model objects that correspond to data objects may be analyzed to discover primary key fields in data objects.

As used herein, the terms "foreign key," or "foreign key field" refer a field of a data object (e.g., a column in a table) where each value for that field matches a value of a primary key field in another data object. Foreign key fields may be considered as defining a reference to other data objects. Model objects that correspond to data objects may be analyzed to discover foreign key fields in data objects.

As used herein, the terms "object relationship," "relationship," or "relation" refer to a reference from a foreign key field in one data object to a primary key field in another data object. A primary key of one data object may be associated with more than one relationship where each relationship is to foreign keys of different data objects. In contrast, a foreign key may provide a relationship to only one primary key. In some cases, object relationships may be referred to as joins. Model objects that correspond to data objects may be analyzed to discover relations between various data objects.

As used herein, the term "system model" refers to a data model that may include multiple data objects. The structure of a system model may be arranged based on one or more relationships between its associated data objects. Model objects that correspond to data objects may be analyzed to discover the relationships that may be included in a system.

As used herein, the term "fact object" refers to a data object that is not referenced by other data objects. Accordingly, fact objects may be data objects that may include foreign key fields that reference other data objects rather than primary key fields. Note, in some cases, for convenience and brevity, model objects that correspond to fact objects may be referred to as fact objects. However, the modeling platform performs analysis and comparisons of the model objects to identify data objects that may qualify as fact objects.

As used herein, the term "internal object" refers to a data object that may include primary key fields referenced by other data objects and foreign key fields that may reference other data objects. Note, in some cases, for convenience and brevity, model objects that correspond to internal objects may be referred to as internal objects. However, the modeling platform performs analysis and comparisons of the model objects to identify data objects that may qualify as internal objects.

As used herein, the term "leaf object" refers to a data object that may include primary key fields referenced by other data objects and no foreign key fields that reference other data objects. Note, in some cases, for convenience and brevity, model objects that correspond to leaf objects may be referred to as leaf objects. However, the modeling platform performs analysis and comparisons of the model objects to identify data objects that may qualify as leaf objects.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing data. In one or more of the various embodiments, one or more attributes of one or more model fields of a plurality of model objects may be analyzed. In one or more of the various embodiments, if the analysis of the one or more attributes provides one or more primary key fields in the one or more model objects of the plurality of model objects, additional actions may be performed.

In one or more of the various embodiments, one or more characteristics of the one or more primary keys may be compared with the one or more characteristics of one or more other model objects. In one or more of the various embodiments, comparing the one or more characteristics of the one or more primary keys with the one or more characteristics of the one or more other model objects may include comparing a similarity of a field name of the one or more primary key fields to a name of one or more model object fields of the one or more other model objects and comparing the similarity of a field name of the one or more primary key fields to an object name of the one or more other model objects.

In one or more of the various embodiments, comparing the one or more characteristics of the one or more primary keys with the one or more characteristics of the one or more other model objects may further include comparing a bloom filter bit-vector of the one or more primary key fields to a bloom filter bit-vector of one or more candidate foreign key fields and if a fraction of non-zero entries in the bloom filter bit-vector of the one or more candidate foreign key fields matched by non-zero entries in the bloom filter bit-vectors of the one or more primary key fields exceeds a defined threshold value, an affirmative result may be provided to indicate that the one or more candidate foreign key fields may be one or more foreign key fields.

In one or more of the various embodiments, if one or more affirmative results of the comparison indicate that one or more foreign key fields may be in the one or more other model objects, still further actions may be taken.

In one or more of the various embodiments, one or more relationships that associate the one or more primary key fields with the one or more foreign key fields may be provided.

And, in one or more of the various embodiments, a system model may be provided based on the one or more relationships and the one or more model objects that include the one or more primary key fields and the one or more other model objects that include the one or more foreign key fields. In one or more of the various embodiments, providing the system model, may include providing one or more data objects that correspond to the one or more model objects and providing one or more other data objects that correspond to the one or more other model objects.

In one or more of the various embodiments, the one or more primary key fields may be provided based on one or more of, a number of null entries remaining below a defined threshold, a conformance to one or more defined data types, or a ratio of a cardinality value to a number of entries exceeding a defined threshold value.

In one or more of the various embodiments, if a first model object field of a model object may be disqualified from being a primary key field, the model object may be designated as a fact object, and the data object that corresponds to the model object may be designated as the fact object of the system model.

In one or more of the various embodiments, the system model may be displayed in a user interface of an application on a hardware display to enable a user to provide feedback for the system model. And, in one or more of the various embodiments, if the user provides feedback for the system model, the system model may be updated based on the provided feedback.

In one or more of the various embodiments, if a model object includes least one primary key field and at least one foreign key field, the model object may be designated as an internal object, and a data object that corresponds to the model object may be designated as an internal object of the system model. And, in one or more of the various embodiments, if the model object includes at least one primary key field absent any foreign key fields, the model object may be designated as a leaf object, and a data object that corresponds to the model object may be designated as a leaf object of the system model.

Illustrated Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, modeling platform server computer 116, one or more source data server computers 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), or other device identifiers. Such information may be provided in a network packet, or the like, sent between other client computers, modeling platform server computer 116, one or more source data server computers 118, or other computers.

Client computers 102-105 may further be configured to include a client application that enables an end-user to log into an end-user account that may be managed by another computer, such as modeling platform server computer 116, one or more source data server computers 118, or the like. Such an end-user account, in one non-limiting example, may be configured to enable the end-user to manage one or more online activities, including in one non-limiting example, project management, software development, system administration, data modeling, search activities, social networking activities, browse various websites, communicate with other users, or the like. Also, client computers may be arranged to enable users to display reports, interactive user-interfaces, and/or results provided by modeling platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, modeling platform server computer 116, one or more source data server computers 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of modeling platform server computer 116 is described in more detail below in conjunction with FIG. 3. Briefly, however, modeling platform server computer 116 includes virtually any network computer that is specialized to provide data modeling services as described herein.

Although FIG. 1 illustrates modeling platform server computer 116 as a single computer, the innovations and/or embodiments are not so limited. For example, one or more functions of modeling platform server computer 116, or the like, may be distributed across one or more distinct network computers. Moreover, modeling platform server computer 116 is not limited to a particular configuration such as the one shown in FIG. 1. Thus, in one embodiment, modeling platform server computer 116 may be implemented using a plurality of network computers. In other embodiments, server computers may be implemented using a plurality of network computers in a cluster architecture, a peer-to-peer architecture, or the like. Further, in at least one of the various embodiments, modeling platform server computer 116 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
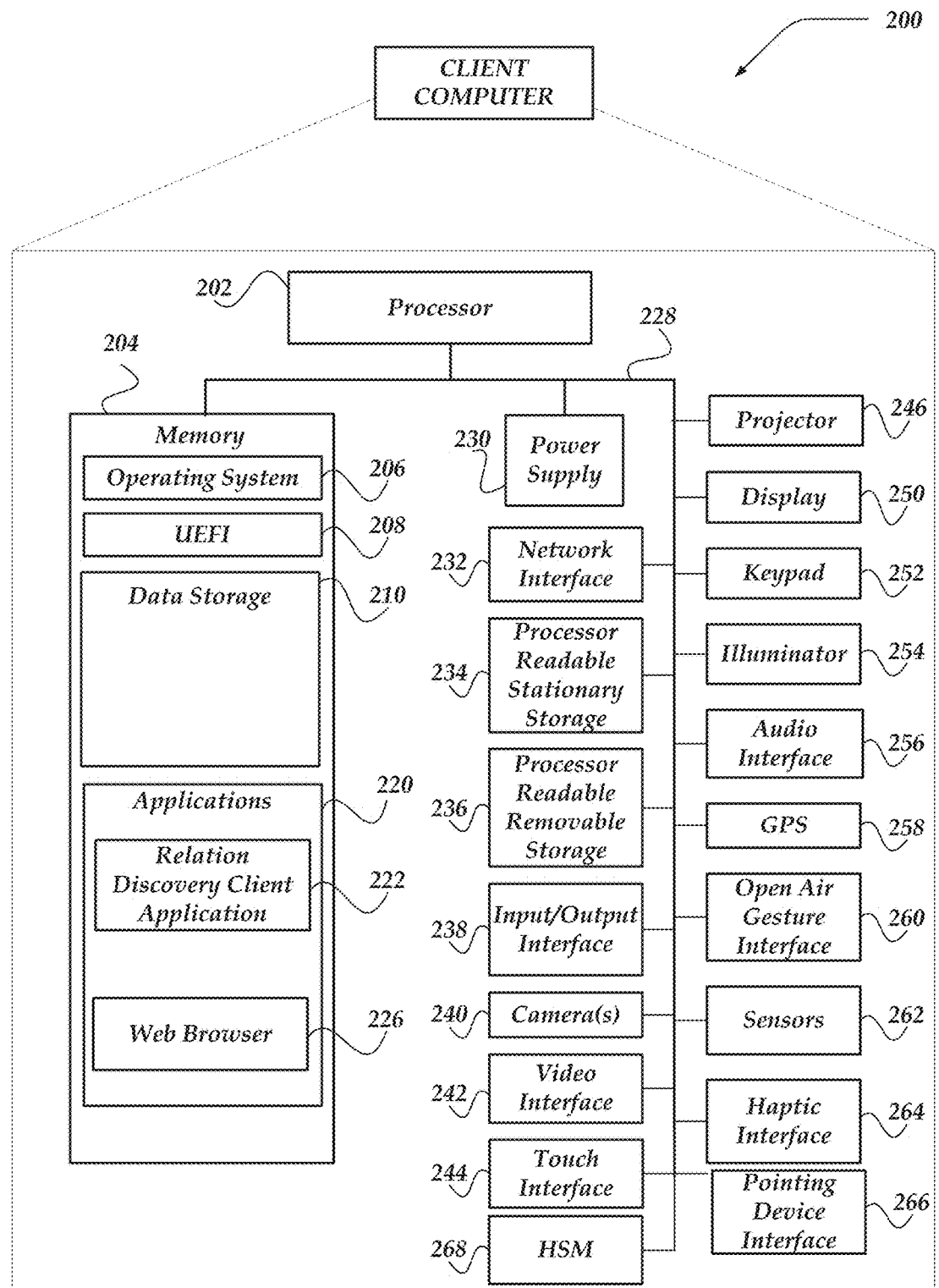
FIG. 2 shows a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include one or more processors, such as processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope, accelerometer, or the like may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, electronic paper, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, Bluetooth Low Energy. or the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, flow execution engine 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™, Bluetooth Low Energy, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, user credentials, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, relation discovery client application 222. In at least one of the various embodiments, relation discovery client application 222 may be used to interact with a modeling platform.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
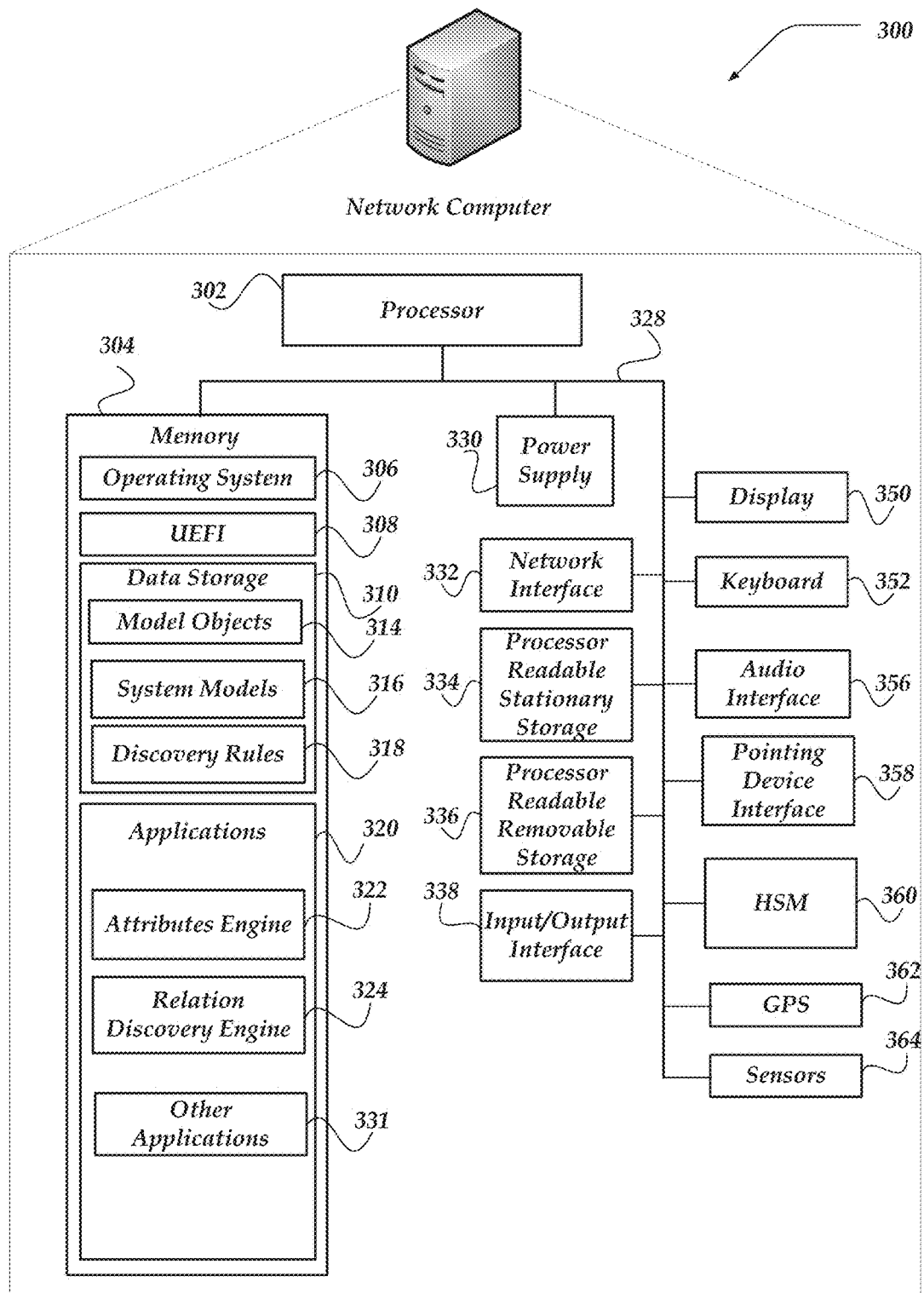
FIG. 3 illustrates a schematic embodiment of a network computer.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 116 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, model objects 314, system models 316, discovery rules 318, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include attributes engine 322, relation discovery engine 324, other applications 331, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, attributes engine 322, relation discovery engine 324, other applications 331, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geo-location protocols over the networks, such as, wireless network 108 and/or network 110.

Furthermore, in at least one of the various embodiments, attributes engine 322, relation discovery engine 324, other applications 331, may be operative in a cloud-based computing environment. In at least one of the various embodiments, these engines, and others, that comprise the modeling platform that may be executing within virtual machines and/or virtual servers that may be managed in a cloud-based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to attributes engine 322, relation discovery engine 324, other applications 331, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

Figure 4:
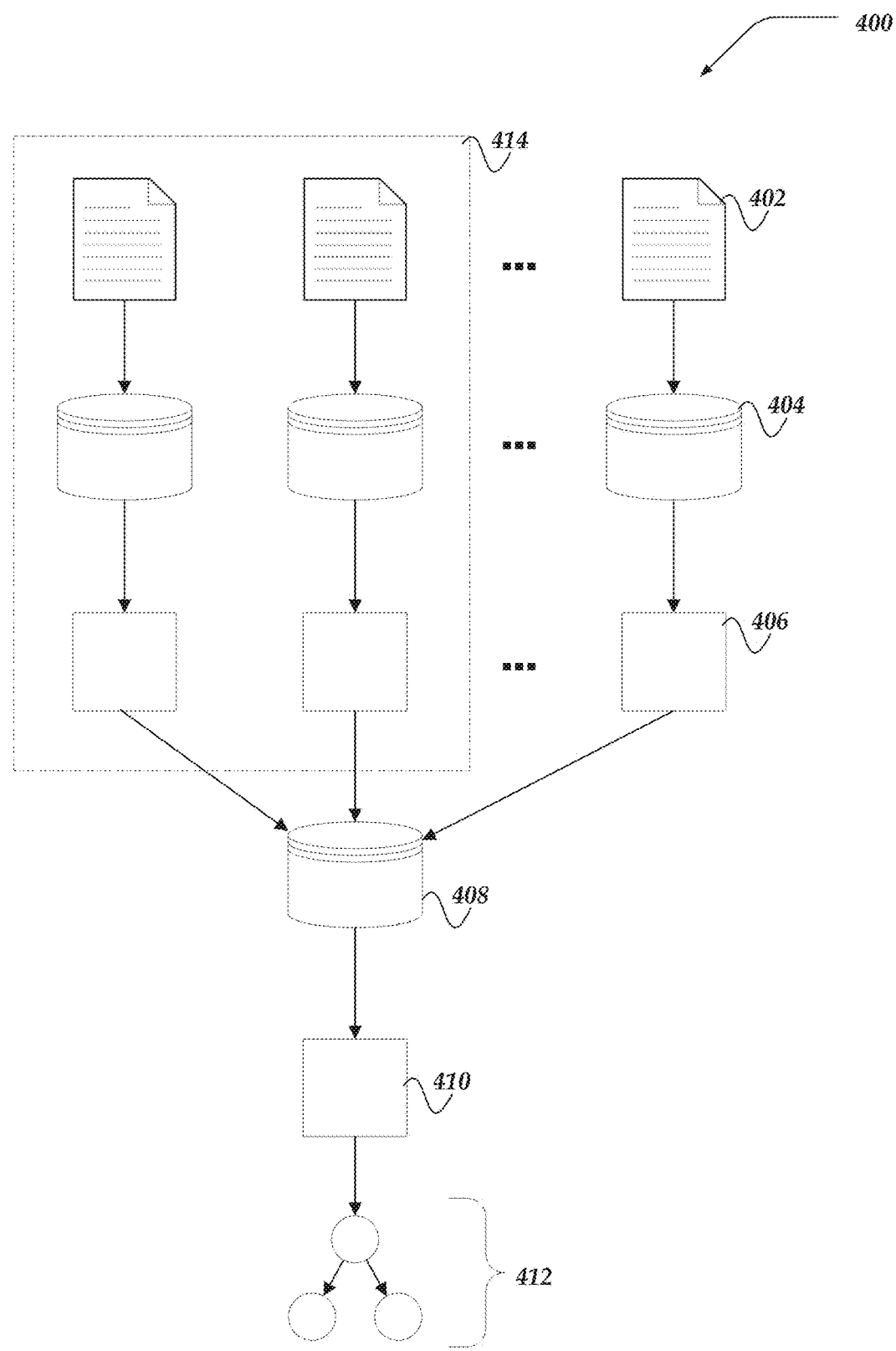
FIG. 4 shows a logical schematic of a portion of a modeling platform that is arranged to perform machine-assisted key discovery and relation generation in accordance with one or more embodiments.

FIG. 4 shows a logical schematic of a portion of modeling platform 400 that is arranged to perform machine-assisted key discovery and relation generation in accordance with one or more embodiments. In one or more of the various embodiments, a modeling platform may be arranged to analyze datasets to produce one or more model objects. Further, the modeling platform may be arranged to discover one or more relationships between the data objects based on an analysis of the model objects to provide a system model that includes two or more data objects and the discovered relationships.

In one or more of the various embodiments, modeling platform 400 may be provided various raw datasets from sources. In some embodiments, these datasets may be very large collections with several or millions of records per data object. Accordingly, a modeling platform such as modeling platform 400, may be used to model the datasets.

In one or more of the various embodiments, a feature of the modeling platform may be that it takes datasets and produces system models that enable a user or application to gain insights into the underlying data and its relationships. In particular modeling platform 400 may be arranged to identify fields in the different data objects that correspond to relationships with other data objects. In some embodiments, these relationships may be considered in terms determining the one or more data objects that are likely to joined to produce query results, reports, or the like.

In one or more of the various embodiments, dataset 402 may be provided to data store 404. As described in above, data set 402 may be different forms, formats, and so on. Also, in one or more of the various embodiments, data set 402 may be the result of some initial data cleansing or data formatting before being stored on data store 404.

In one or more of the various embodiments, an attributes engine, such as, attributes engine 406 may be analyze the data object stored in data store 404. Briefly, attributes engine 406 may process the data objects included in data set 402 to produce one or more model objects that correspond to the data objects.

In one or more of the various embodiments, as model objects are generated they may be stored in another date store, such as, data store 408. In one or more of the various embodiments, data store 408 represents a data store for storing one or more model objects. In some embodiments, data store 408 may be logically or physically separate from data store 404. Further, in some embodiments, data stores, such as data store 404 and data store 408 may be physical or logically segmented into portions the are allocated to one or more users. Accordingly, in some embodiments, one or more users may be prevented from accessing data and objects unless they have explicit access permissions.

In one or more of the various embodiments, a relation discovery engine, such as relation discovery engine 410 may be arranged to analyze one or more model objects to identify relationships between the model objects. In one or more of the various embodiments, the analysis may include identifying one or more potential primary key fields or one or more potential foreign key fields that may define the one or more relationships between the data objects that correspond to the model objects.

In one or more of the various embodiments, relationships discovered in the model objects may correspond to relationships in the underlying data objects. However, in one or more of the various embodiments, directly analyzing very large data sets that include data objects that include millions of records to discover relationships may be computationally prohibitive. Accordingly, in one or more of the various embodiments, performing the analysis using analogous model objects may reduce computation costs and time and significantly improve performance.

In one or more of the various embodiments, relation discovery engine 410 may be arranged to classify the one or more model objects based on the types of keys or relationships included in the model objects. In one or more of the various embodiments, model objects may be classified into fact model objects, internal model objects, and leaf model objects based on the type key fields (e.g., primary key fields or foreign key fields) that may they include. Thus, in one or more of the various embodiments, since the model objects are analogous to data objects, their corresponding data objects may be classified the same as their model object. Accordingly, for clarity and brevity, herein if a model object is referred to as one of a fact object, internal object, or leaf object it may be assumed that the model object's corresponding data object may be similarly referred.

In one or more of the various embodiments, relation discovery engine 410 may be arranged to provide one or more system models, such as system model 412 that represent the organization of the data objects based on the classification of the data objects (e.g., fact, internal, or leaf) and the discovered relationships.

In one or more of the various embodiments, attributes engine 406 may be arranged to perform analysis comprised of monoidal operations that enable two or more attribute engine instances to run in parallel. In some embodiments, portions of data sets may be distributed across one or more data stores. Accordingly, in some embodiments, two or more attribute engines may process portions of the data sets to produce partial attribute values. Thus, in one or more of the various embodiments, the partial attribute values may be reduced or combined to produce attribute values for the model objects stored in data store 408.

In one or more of the various embodiments, partial cluster 414 represents parallel or concurrent operations performed by two or more attribute engines. Note, in some embodiments, the separate attribute engines may be arranged to process data objects stored on the same or shared data store.

Figure 5:
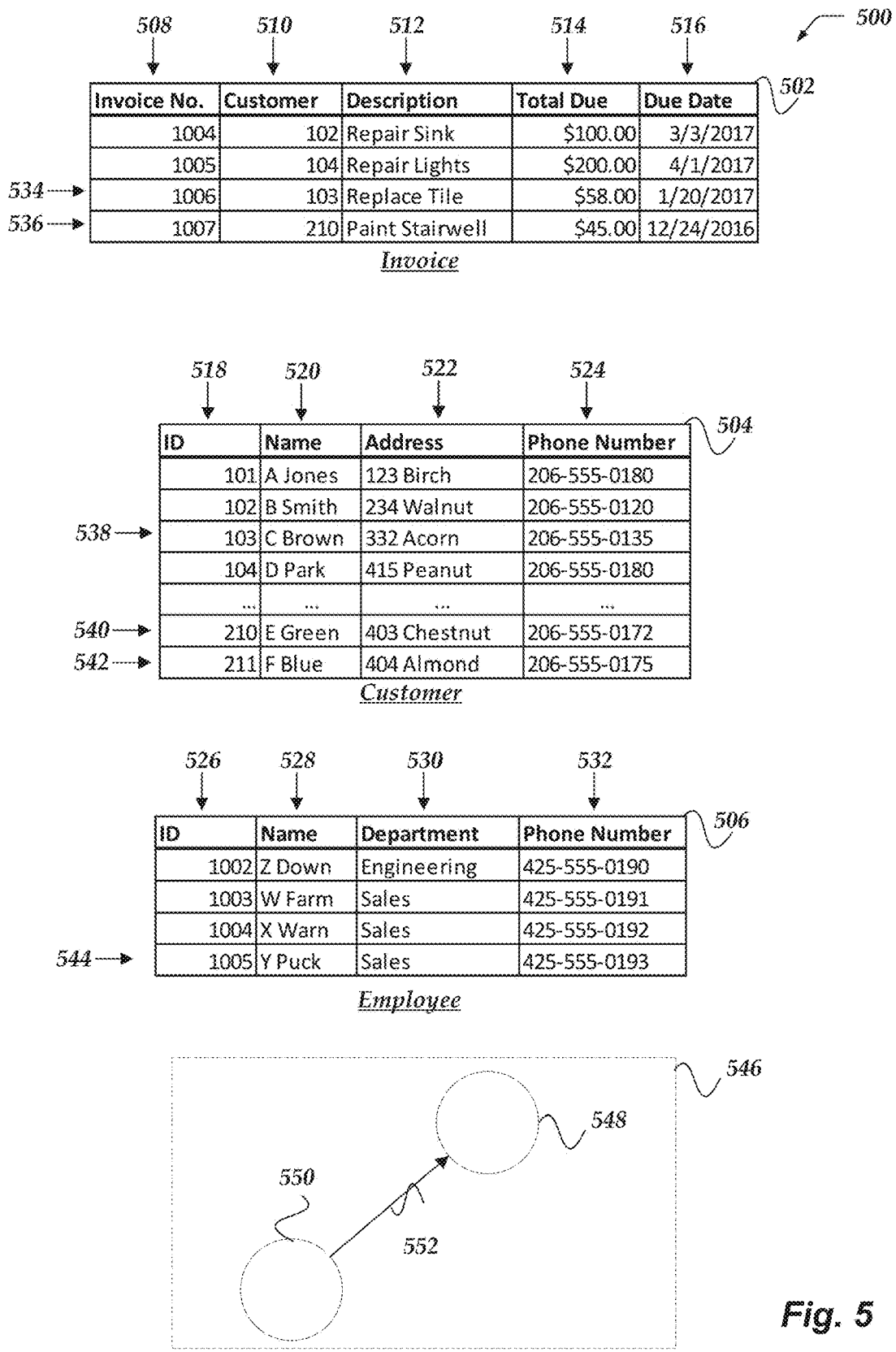
FIG. 5 shows a logical schematic of a portion of a data set that may be provided to a modeling platform that is arranged to perform machine-assisted key discovery and relation generation in accordance with one or more embodiments.

FIG. 5 shows a logical schematic of a portion of data set 500 that may be provided to a modeling platform that is arranged to perform machine-assisted key discovery and relation generation in accordance with one or more embodiments. Data set 500 is provided as example that may be used to describe and clarify one or more of the innovation included herein. Accordingly, FIG. 5 may be referred to in examples presented below.

In one or more of the various embodiments, data set 500 may include one or more data objects, such as, data object 502, data object 504, and data object 506. In this example, each data object has a number of named fields. In this example: data object 502 includes fields 508-510; data object 504 includes fields 518-224; and data object 506 includes fields 526-532. Also, as shown in FIG. 5, each data object may be associated with a name, accordingly, data object 502 is named Invoices, data object 504 is named Customers, and data object 506 is named Employees.

In this example, the data objects include relationships. In particular, field 510 (e.g., Invoice:Customer) appears to contain values from field 518 (Customer:ID). Likewise, field 508 (Invoice::InvoiceNo) appears to include values from field 526 (Employee:ID). For example, in row 534, field 510 (Customer) has a value of '103' that appears to correspond to the ID field (field 518) for row 538. Also, in row 536, field 510 (Customer) has a value of '210' that appears to correspond to the ID field (field 518) for row 540. Accordingly, a review of the values for field 510 and field 518, that field 518 may be a primary key field of data object 504 and field 510 may be a foreign key field of data object 502.

Also, row 542 includes an ID value (field 518) that is not included in field 508 of data object 502. And, in this example, row 544 includes an ID value (field 526) that is included in field 508 of data object 502.

In one or more of the various embodiments, as introduced above, a relation discovery engine, such as relation discovery engine 324 may be arranged discover relationships between data objects based on their corresponding model objects. Thus, the discovered relationships may be included in system model, such as system model 546. Accordingly, for this example, in one or more of the various embodiments, system model 546 may be arranged to represent that data object 502 (Invoice) has a relationship with data object 504 (Customer). In this example, node 548 may correspond to data object 502 and node 550 may correspond to data object 504. Likewise, in this example, directed edge 552 may represent the relationship between data object 502 and data object 504. In this example, directed edge 552 represents that a primary key field of data object 504 (field 518) corresponds to a foreign key field of data object 502 (field 510).

For brevity and clarity, data object 502, data object 504, and data object 506 are represented using a table/tabular format. One of ordinary skill in the art will appreciate that data sets or data objects may be arranged differently using different formats, data structures, objects, or the like, without departing from the scope of these innovations.

Figure 6:
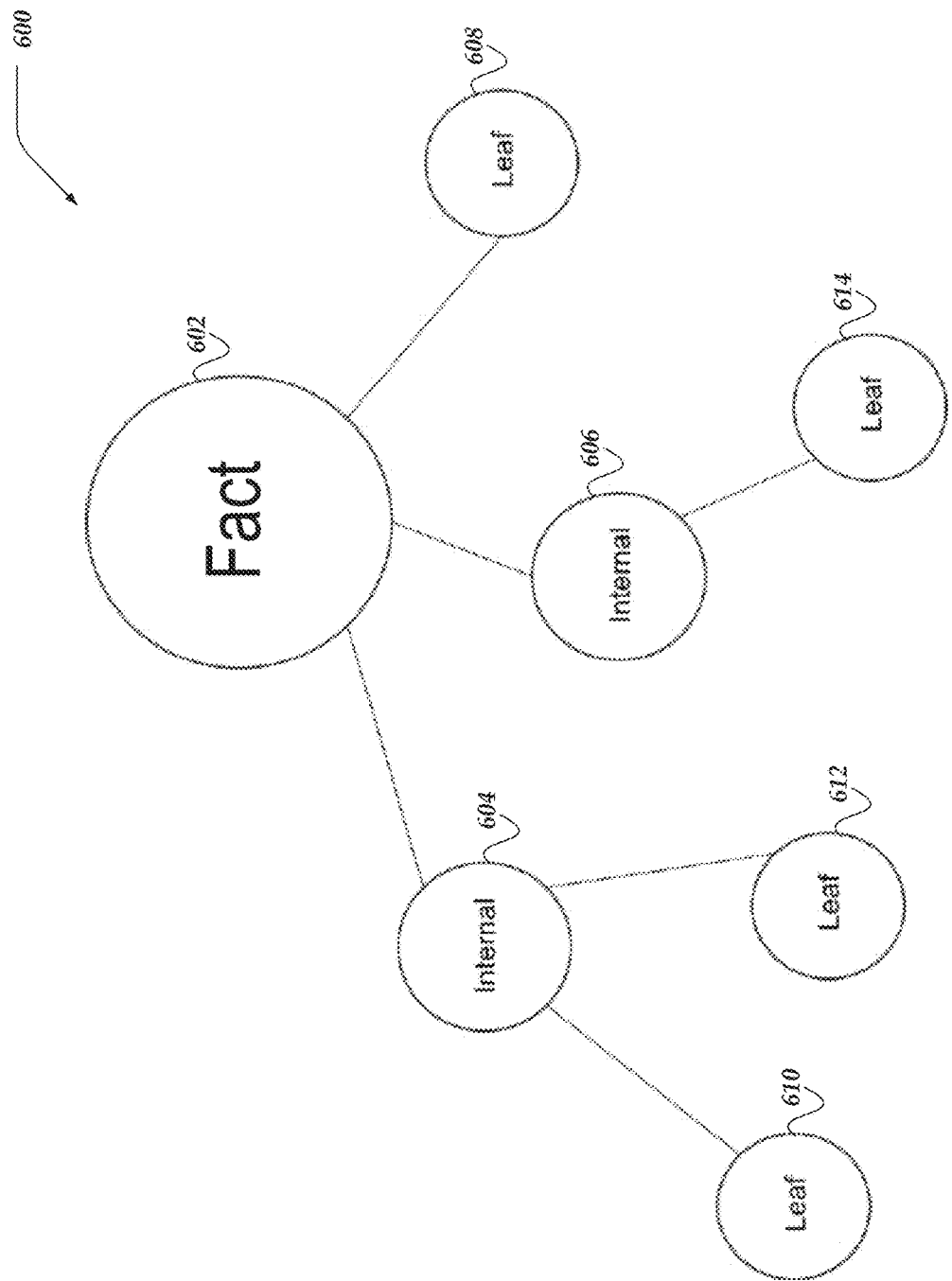
FIG. 6 shows a logical schematic of a portion of a system model that may be provided by a modeling platform that is arranged to perform machine-assisted key discovery and relation generation in accordance with one or more embodiments.

FIG. 6 shows a logical schematic of a portion of system model 600 that may be provided by a modeling platform that is arranged to perform machine-assisted key discovery and relation generation in accordance with one or more embodiments.

In one or more of the various embodiments, modeling platforms may be arranged to generate system models that describe relationships of data objects. Accordingly, in one or more of the various embodiments, system model 600 represents a simplified example of a system model. In this example: node 602 represents a fact object; node 604 represents an internal object; node 606 represents an internal object; node 608 represents a leaf object; node 610 represents a leaf object; node 612 represents a leaf object; and node 614 represents a leaf object.

In one or more of the various embodiments, node 602 represents fact object because the only key fields it includes are foreign key fields that correspond to primary key fields of other data objects. In this example, primary key fields in system object 604, system object 606, and system object 608 correspond to foreign key fields in the fact object at node 602.

In one or more of the various embodiments, a relation discovery engine may be arranged to discover the one or more relations that comprise a system model. In one or more of the various embodiments, the discovery of the one or more relations may be based on analysis of the model objects that correspond to the data objects that comprise the system model.

Figure 7:
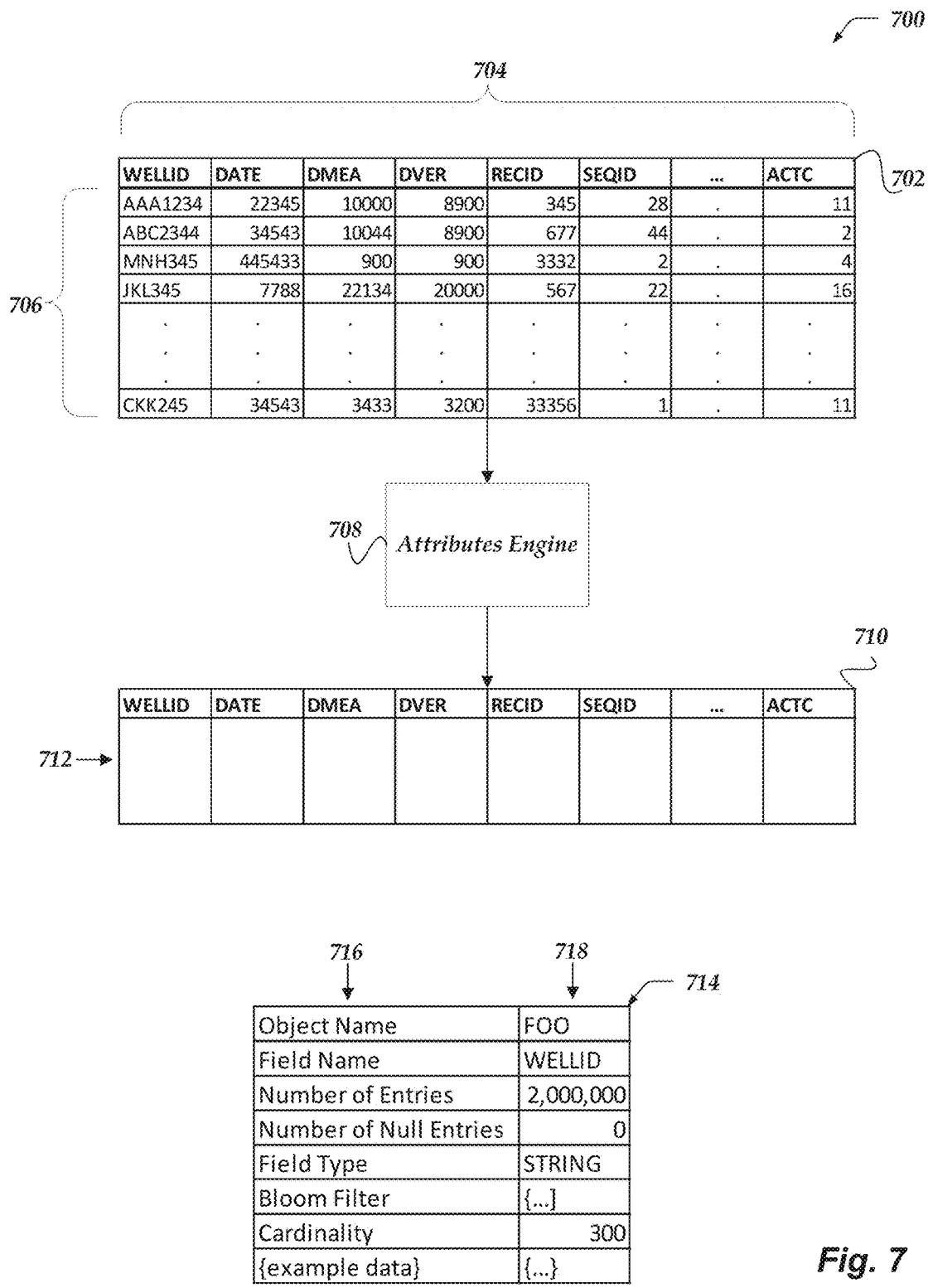
FIG. 7 shows a logical schematic of a portion of a modeling platform that is arranged to perform machine-assisted key discovery and relation generation in accordance with one or more embodiments.

FIG. 7 shows a logical schematic of a portion of modeling platform 700 that is arranged to perform machine-assisted key discovery and relation generation in accordance with one or more embodiments. As introduced above, and explained in more detail below, modeling platforms may be arranged to analyze one or more data objects of a data set to provide one or more model objects that correspond to the one or more data objects.

In this example, for some embodiments, data object 702 may include several fields, such as fields 704 and several rows or records (rows 706). In this example, data object 702 may represent electronics telemetry data provided by a commercial oil well. This example is selected to emphasize that modeling platforms may be arranged to process very large data set (e.g., Bigdata). In some cases, oil drills are configured to produce real-time telemetry information. The amount of data produced may be in the terabyte range.

Relevant to this example, Wellsite Information Transfer Specification (WITS) is a communications format used for the transfer of a wide variety of oil well data from one computer system to another. Accordingly, Operating and Service companies involved in the Exploration and Production areas of the Petroleum Industry may use WITS to exchange data in either an online or batch transfer mode. In this example, data object 702 represents a portion of a "Pressure Evaluation" data object as defined by WITS. WITS defines Pressure Evaluation objects as having 25 fields (for brevity only eight fields are shown here in fields 704).

Accordingly, in this example, an attributes engine, such as attributes engine 708 may be arranged to analyze data object 702 to provide a corresponding model object, such as model object 710. In one or more of the various embodiments, model objects may be arranged to include one or more model object fields that correspond to one or more of the data object fields of its underlying data object. In this example, model object 710 may be assumed to have the same number of model object fields as data object fields 704. However, rather having thousands or millions of rows (e.g., rows 706), each model object field may be arranged to have an attribute collection, such as attribute collection 714. In this example, the attributes collection includes attributes gleaned from the data object. In this example, attributes collection 714 include attributes such as, object name, field name, number of entries, field type, a bloom filter with associated bit-vector, cardinality, and small collection of sample data.

In this example, attributes collection 714 corresponds to the first field in data object 702 (e.g., WELLID). Accordingly, for this example is includes values, such as: Object Name=FOO; Field Name=WELLID; Number of Entries=2,000,000; Number of Null Entries=0; Field Type=STRING; A bloom filter and its bit-vector; Cardinality=300; and some example data extracted from data object 702.

Figure 8:
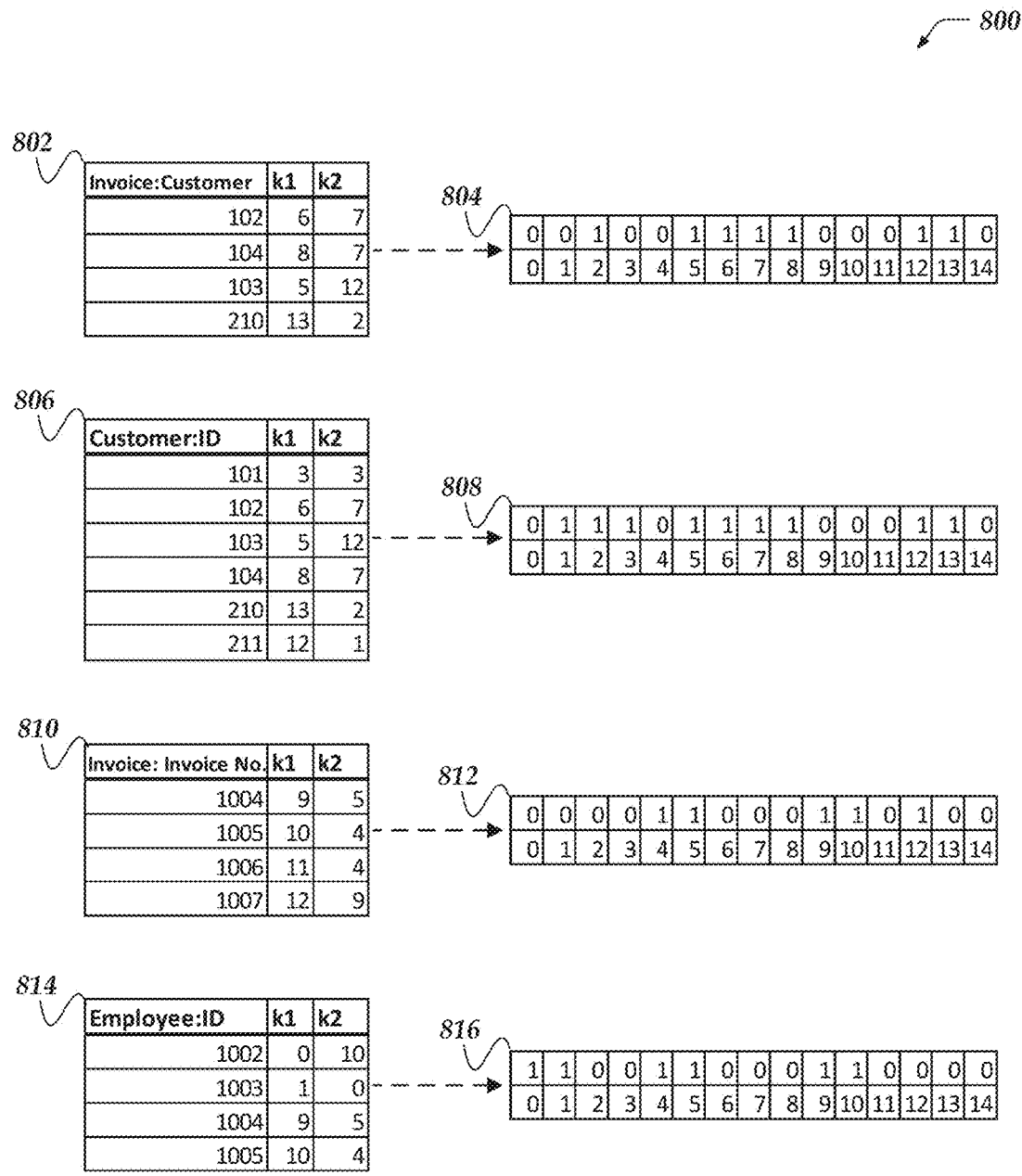
FIG. 8 shows a logical schematic of a portion of an attributes collection representing bloom filters associated with a data object field in accordance with one or more embodiments.

FIG. 8 shows a logical schematic of a portion of attributes collection 800 representing bloom filters associated with a data object field in accordance with one or more embodiments. In one or more of the various embodiments, an attributes engine, such as attributes engine 322 may be arranged to provide a bloom filter that corresponds to each field of a data object. As an aid to clarifying further discussions, FIG. 8 illustrates bloom filters for selected fields of the data object shown in FIG. 5.

In one or more of the various embodiments, an attributes engine may produce bloom filters for one or more data object fields based on the values of the respective fields. Accordingly, the attributes engine may be arranged to select a vector length M and two or more hash functions. During the analysis of the data object fields the attributes engine may compute a hash value for each field entry for each hash function. In this example, M is 15 and there are two hash functions (not shown) that produce k1 and k2 for each entry. The k values correspond a hash value of the field entry produced by a given hash function. Here, k1 is provided by a first hash function and k2 is provided by a second hash function. The two hash functions may be different. Or, they may be repeated hashes made using the same hash function. For example, referring bloom to filter 802, if hash function H1 is one hash function and H2 is another hash function, 15 mod H1(102)=6=k1 and 15 mod H2(102)=7=k2. Note, this example includes applying a modulo function to ensure that the values for k1 and k2 fall within a range that fits into a bit-vector of length M. Alternatively, one hash function may be used more than once to simulate multiple hash functions. For example, M mod H1(102)=6=k1 and M mod H1(H1(102))=7=k2.

Thus, for each data object field kn values are produced by n-number of hash functions. Further, the bit-vector position that corresponds to each k value for each data object field value may be set to 1. In this example: bloom filter 802 produces bit-vector 804 from the values of field 510 (Invoice:Customer); bloom filter 806 produces bit-vector 808 from the values of field 518 (Customer:ID); bloom filter 810 produces bit-vector 812 from the values of field 508 (Invoice:Invoice No.); and bloom filter 814 produces bit-vector 816 from the values of field 526 (Employee:ID).

Generalized Operations

FIGS. 9-15 represent the generalized operations for machine-assisted key discovery and relation generation in accordance with at least one of the various embodiments. In one or more of the various embodiments, processes 900, 1000, 1100, 1200, 1300, 1400, and 1500 described in conjunction with FIGS. 9-15 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, one or more of the various embodiments, the processes described in conjunction with FIGS. 9-15 may be operative in machine-assisted key discovery and relation generation such as described in conjunction with FIGS. 4-8.

Figure 9:
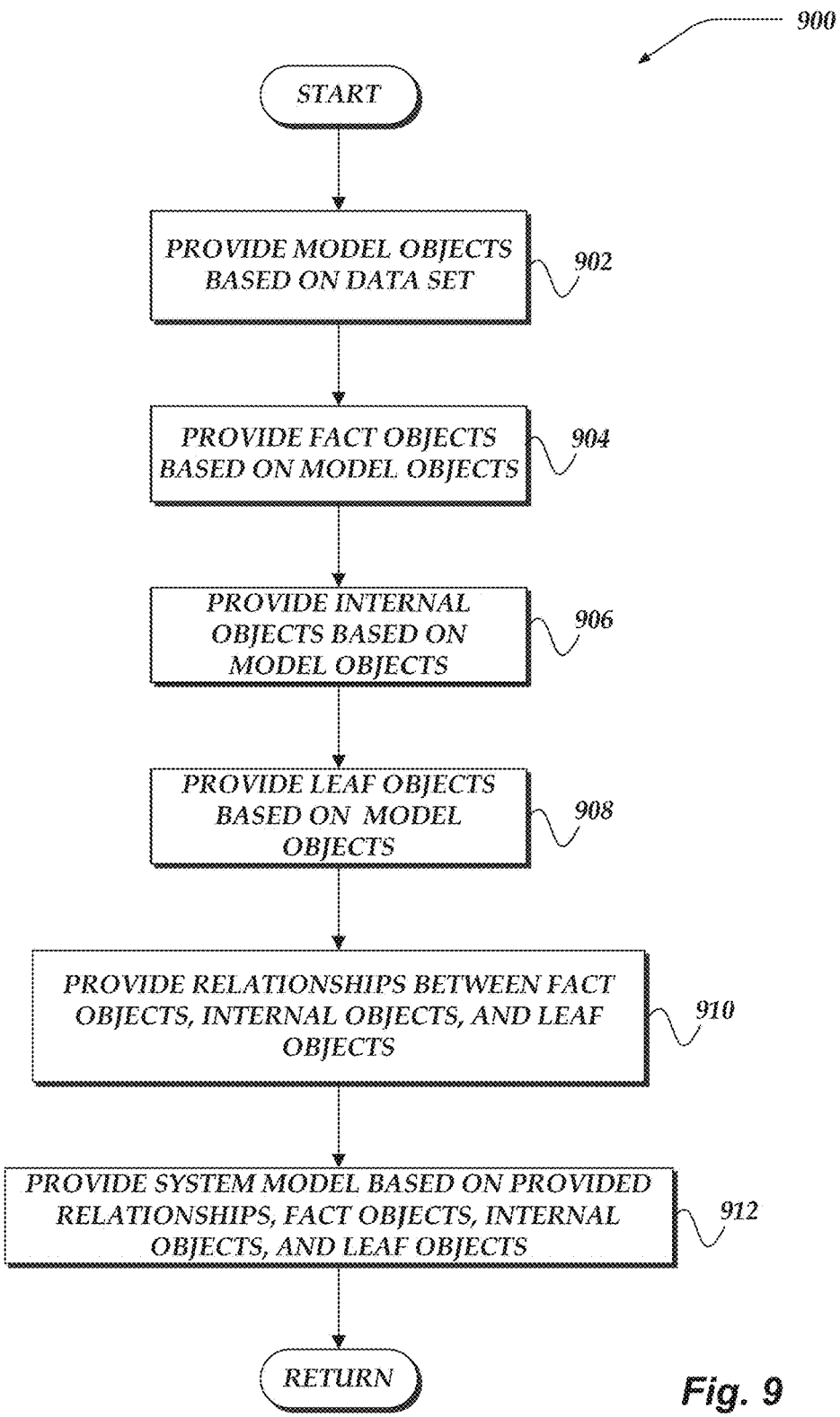
FIG. 9 illustrates an overview flowchart for a process for machine-assisted key discovery and relation generation in accordance with one or more of the various embodiments.

FIG. 9 illustrates an overview flowchart for process 900 for machine-assisted key discovery and relation generation in accordance with one or more of the various embodiments. After a start block, at block 902, in one or more of the various embodiments, a modeling platform may be arranged to provide one or more model objects based on one or more data sets. In one or more of the various embodiments, the modeling platform may employ an attributes engine to provide model objects that correspond to data objects included in the one or more data sets.

At block 904, in one or more of the various embodiments, the modeling platform may be arranged to provide a fact object based on the model objects. Accordingly, in some embodiments, the modeling platform may be arranged to employ a relation discovery engine, such as relation discovery engine 324 to discover one or more potential fact objects using the model objects.

In one or more of the various embodiments, one or more model objects may be analyzed by the relation discovery engine to determine which data object may be a fact object. Note, in some cases, for convenience and brevity, model objects that correspond to fact objects may be referred to as fact objects. However, the modeling platform performs analysis and comparison of the model objects to identify data objects that may qualify as fact objects.

At block 906, in one or more of the various embodiments, the modeling platform may be arranged to provide one or more internal objects based on the model objects. Accordingly, in some embodiments, the modeling platform may be arranged to employ a relation discovery engine, such as relation discovery engine 324 to discover one or more potential internal objects based on the model objects.

In one or more of the various embodiments, one or more model objects may be analyzed by the relation discovery engine to determine which data objects may be internal objects. Note, in some cases, for convenience and brevity, model objects that correspond to internal objects may be referred to as internal objects. However, the modeling platform performs analysis and comparison of the model objects to identify data objects that may qualify as internal objects.

At block 908, in one or more of the various embodiments, the modeling platform may be arranged to provide one or more leaf objects based on the model objects. Accordingly, in some embodiments, the modeling platform may be arranged to employ a relation discovery engine, such as relation discovery engine 324 to discover one or more potential leaf objects based on the model objects.

In one or more of the various embodiments, one or more model objects may be analyzed by the relation discovery engine to determine which data objects may be leaf objects. Note, in some cases, for convenience and brevity, model objects that correspond to leaf objects may be referred to as leaf objects. However, the modeling platform performs analysis and comparison of the model objects to identify data objects that may qualify as leaf objects.

At block 910, in one or more of the various embodiments, the modeling platform may be arranged to provide one or more relations between one or more of the fact objects, the internal objects, and the leaf objects. Accordingly, in some embodiments, the modeling platform may be arranged to employ a relation discovery engine, such as relation discovery engine 324 to discover one or more potential relationships based on the fact object, the internal objects, and the leaf objects.

In one or more of the various embodiments, one or more model objects may be analyzed by the relation discovery engine to determine the relationships between data objects. Note, in some cases, for convenience and brevity, model objects may be described as having relationships based on the analysis. However, the modeling platform performs analysis and comparison of the model objects to identify potential relationships between data objects.

At block 912, in one or more of the various embodiments, the modeling platform may be arranged to provide a system model that may be based on the discovered relations, the fact object, the internal objects, and the leaf objects. Accordingly, in some embodiments, the modeling platform may be arranged to employ a relation discovery engine, such as relation discovery engine 324 to provide a system model based on the one or more relations, the fact object, the internal objects, and the leaf objects. Next, control may be returned to a calling process.

Figure 10:
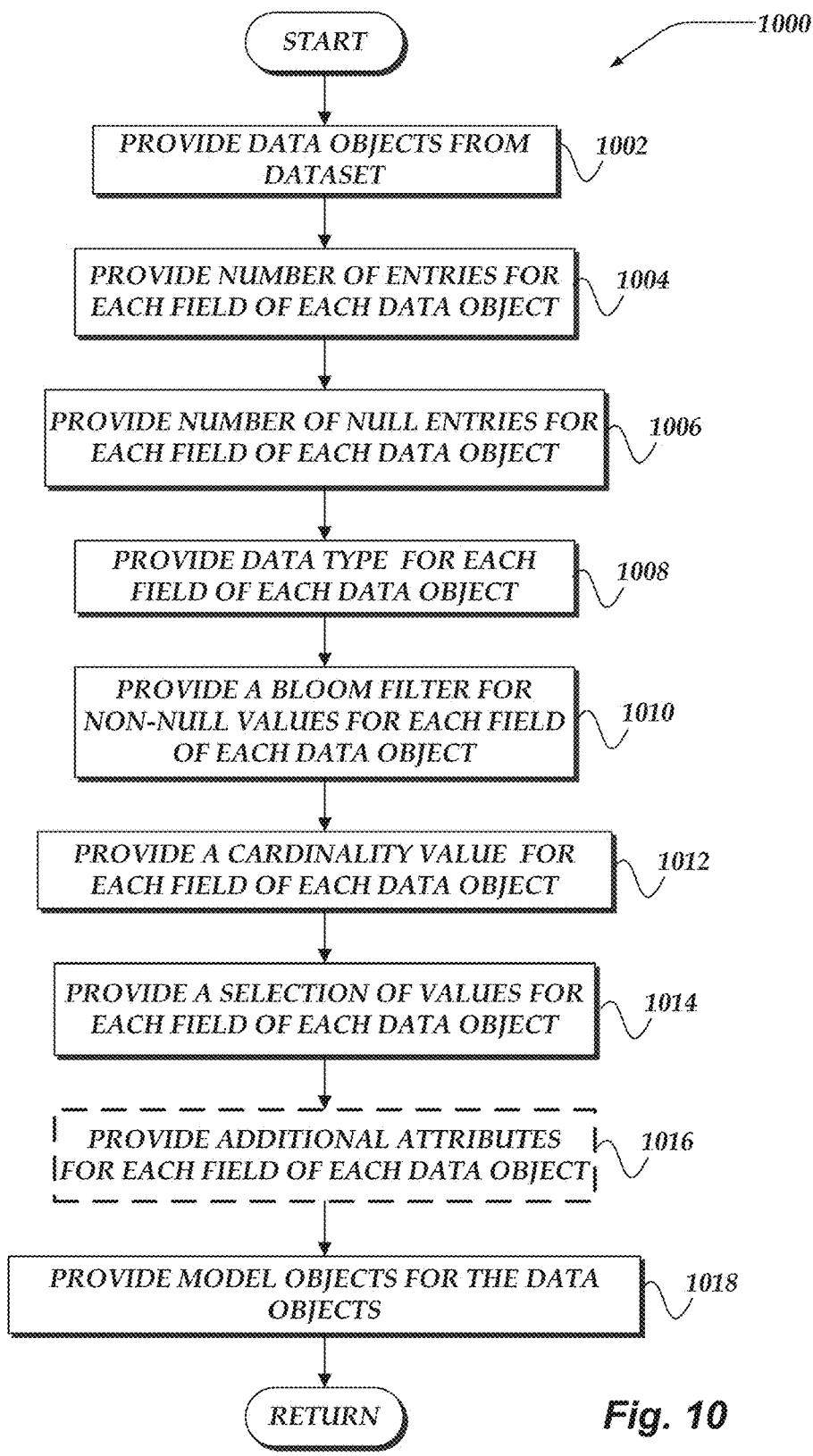
FIG. 10 illustrates an overview flowchart for a process for providing model objects based on data objects for machine-assisted key discovery and relation generation in accordance with one or more of the various embodiments.

FIG. 10 illustrates an overview flowchart for process 1000 for providing model objects based on data objects for machine-assisted key discovery and relation generation in accordance with one or more of the various embodiments. After a start block, at block 1002, in one or more of the various embodiments, one or more data objects may be provided to a modeling platform. As described above datasets may be provided from a variety of sources in a variety of formats to a data store accessible by the attributes engine. Accordingly, in one or more of the various embodiments, the modeling platform may be arranged to execute an attributes engine, such as attributes engine 322 that may be arranged to process the data objects to produce model object that include attribute collections (e.g., model object field attributes) may be used by other services, such as a relation discovery engine, such as relation discovery engine 324 to assess the data objects.

At block 1004, in one or more of the various embodiments, the attributes engine may be arranged to provide the number of entries for each field of each data object. In one or more of the various embodiments, the attributes engine may be arranged to count the number of entries for each field of the each data object. Accordingly, in some embodiments, an attribute such as 'number of entries' may be associated with each model object field.

At block 1006, in one or more of the various embodiments, the attributes engine may be arranged to provide the number of null entries for each field of each data object. In one or more of the various embodiments, the attributes engine may scan the data object fields to count null (or otherwise missing) entries. Accordingly, in some embodiments, an attribute such as 'number of null', or the like, may be associated with each model object field.

At block 1008, in one or more of the various embodiments, the attributes engine may be arranged to provide a data-type for each field of each data object. In one or more of the various embodiments, the attributes engine may execute one or more tests or heuristics to discover the data-type of each data object field. In some embodiments, these test may include pattern matching, or the like, to identify the data-type of each data object field. Accordingly, in some embodiments, an attribute such as 'data-type', or the like, may be associated with each model object field.

At block 1010, in one or more of the various embodiments, the attributes engine may be arranged to provide a bloom filter based on the non-null entries for each field of each data object. Accordingly, in some embodiments, an attribute such as 'bloom filter', or the like, may be associated with each model object field. In some embodiments, a bit-vector representation of the bloom filter may be included as the bloom filter attribute value.

At block 1012, in one or more of the various embodiments, the attributes engine may be arranged to provide a cardinality value for each field of each data object. In one or more of the various embodiments, the attributes engine may employ one or more statistical counting techniques to determine a cardinality value for each field of each data object. Accordingly, in some embodiments, an attribute such as 'cardinality', or the like, may be associated with each model object field.

At block 1014, in one or more of the various embodiments, the attributes engine may be arranged to provide a selection of entry values for each field of each data object. In one or more of the various embodiments, a small selection of actual field entries may be collected. In some embodiments, this collection may be employed to show a user a sample view of the actual data. For example, if a user may be evaluating a proposed system model, they may view the sample data of one or more data object fields to help determine if the relation discovery engine has provided a correct result.

At block 1016, in one or more of the various embodiments, optionally, the attributes engine may be arranged to execute an attributes engine to provide one or more additional attributes for each field of each data object. In one or more of the various embodiments, the attributes engine may be arranged to include instructions (e.g., code, scripts, rules, or the like) for providing one or more other attributes. In some embodiments, there may be configuration information that includes the instructions for providing the additional attributes. Accordingly, in one or more of the various embodiments, the attributes engine may be arranged to include one or more instructions from configuration information and apply the one or more instruction to provide the additional attributes. In some embodiments, this block may be optional because there may not be any additional attributes to provide.

At block 1018, in one or more of the various embodiments, the attributes engine may be arranged to provide one or more model objects that correspond to the data objects. In one or more of the various embodiments, each model object may be arranged to include the provided attributes. Next, control may be provided to a calling process.

Further, in one or more of the various embodiments, the modeling platform may be arranged to execute more than one attributes engine in parallel to provide the model objects. In some embodiments, two or more attributes engines may process different portions of the data set to provide the various attributes. Accordingly, in one or more of the various embodiments, partial results for each data object or data object field may be combined or otherwise aggregated to provide a single value for each attribute that may be associated with each model object field.

Figure 11:
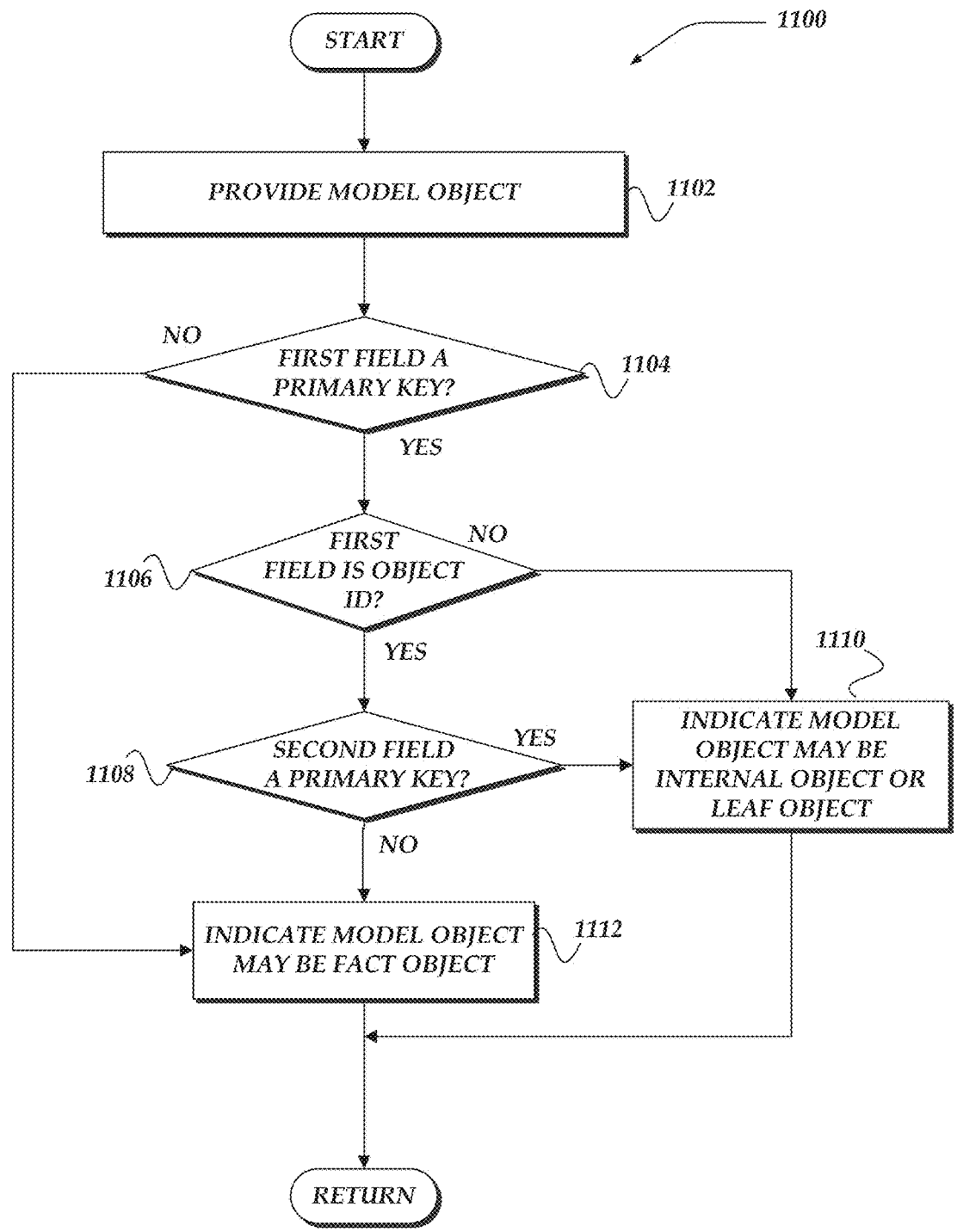
FIG. 11 illustrates an overview flowchart for a process for providing fact objects based on model objects for machine-assisted key discovery and relation generation in accordance with one or more of the various embodiments.

FIG. 11 illustrates an overview flowchart for process 1100 for providing fact objects based on model objects for machine-assisted key discovery and relation generation in accordance with one or more of the various embodiments. In one or more of the various embodiments, process 1100 describes a process for determining if a provided model object may correspond to be a potential fact object. In one or more of the various embodiments, a modeling platform may be arranged to provide a collection of model objects to a relation discovery engine. Accordingly, in some embodiments, the relation discovery engine may be arranged to process each model object to identify one or more potential fact objects.

In one or more of the various embodiments, the collection of model objects may be selected by user via a user-interface or relation discovery client application. In some embodiments, the modeling platform may be arranged to employ one or more rules or pattern matching to select model objects for the collection. In some embodiments, one or more query expressions may be provided by a user or from configuration information, The query expressions may be used select the collection of model objects. Further, in some embodiments, the modeling platform may be arranged or configured to select all available model objects for collection of model objects.

After a start block, at block 1102, in one or more of the various embodiments, one or more model objects may be provided to a relation discovery engine. In one or more of the various embodiments, model objects may be analyzed in parallel using two or more instances of relation discovery engines. The separate relation discovery engines instances may be executed on the same network computer, or in some embodiments, the separate relation discovery engines instances may be arranged to execute on two or more separate network computers.

At decision block 1104, in one or more of the various embodiments, if the first field of the model object may be a primary key field, control may flow to decision block 1106; otherwise, control may flow to block 1112. (See, FIG. 12 below for a detailed description of assessing whether a data model field may be a primary key field based on its corresponding model object field.)

At decision block 1106, in one or more of the various embodiments, if the first field is an object identity field, control may flow to decision block 1108; otherwise, control may flow to block 1110. (See, FIG. 13 below for a detailed description of assessing whether a model object field may correspond to an object identity field in a data object.)

At decision block 1108, in one or more of the various embodiments, if the second field of the model object may be primary key field, control may flow to block 1110; otherwise, control may flow to block 1112. (See, FIG. 12 below for a detailed description of assessing whether a model object field may correspond to a primary key field of a data object.)

At block 1110, in one or more of the various embodiments, the relation discovery engine may indicate that the model object may correspond to an internal object or a leaf object. In one or more of the various embodiments, because the assessment of the model object indicates that the corresponding data object includes a primary key field, it may be excluded from being a fact object. In some embodiments, a fact object may be a data object has one or more foreign key fields and no primary key fields. Accordingly, in some embodiments, since the assessment of the model object determined that the data object may include primary key fields, it may be considered to be an internal object or a leaf object rather than a fact object. Next, control may be returned to a calling process.

At block 1112, in one or more of the various embodiments, the relation discovery engine may indicate that the model object may correspond to potential a fact object. In one or more of the various embodiments, the relation discovery engine may be arranged to indicate the model object and its underlying data object may be consider fact objects since primary key fields were not discovered. Next, in one or more of the various embodiments, control may be returned to a calling process.

Figure 12:
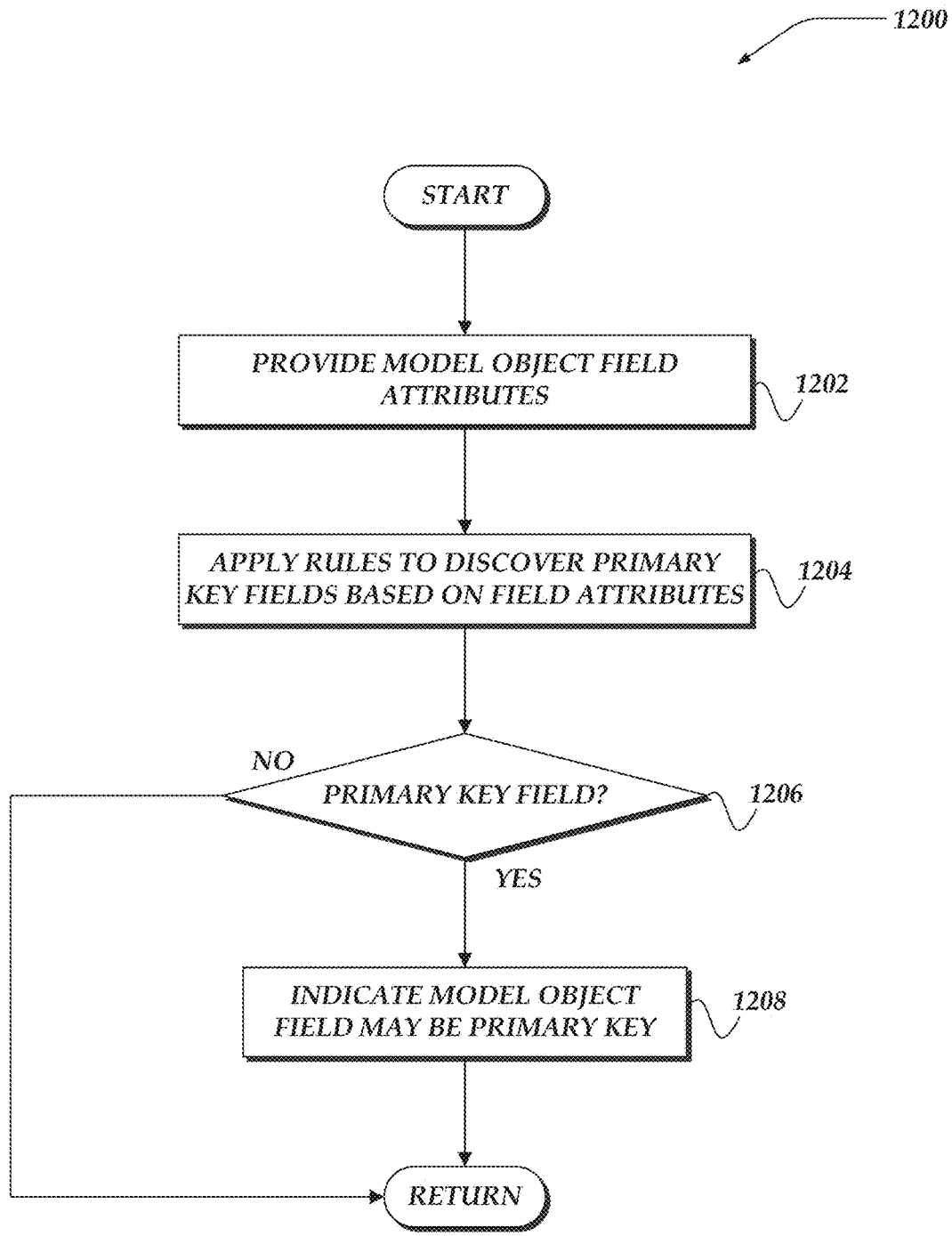
FIG. 12 illustrates a flowchart for a process for discovering primary key fields or machine-assisted key discovery and relation generation in accordance with one or more of the various embodiments.

FIG. 12 illustrates a flowchart for process 1200 for discovering primary key fields or machine-assisted key discovery and relation generation in accordance with one or more of the various embodiments. In one or more of the various embodiments, process 1200 describes a process for determining if a provided model object field may correspond to a potential primary key field of its underlying data object. After a start block, at block 1202, in one or more of the various embodiments, an attribute collection for a model object field may be provided to a relation discovery engine.

At block 1204, in one or more of the various embodiments, the relation discovery engine may be arranged to apply one or more tests/rules to discover if the model object field may be a primary key field based on the attributes associated with the model object field.

In one or more of the various embodiments, the relation discovery engine may be arranged to execute one or more operations to assess if a model object field may be a primary key field. In one or more of the various embodiments, the particular methods may be determined based on configuration information. Further, in some embodiments, the relation discovery engine may be arranged to apply various variables for tuning the methods. In some embodiments, the configurable variables may be provided from configuration information. In some embodiments, the configuration information may include threshold values, patterns (e.g., regular expressions, wildcards, or the like), script portions, references/links to other software modules or computer libraries, or the like, or combination thereof.

In one or more of the various embodiments, the relation discovery engine may be arranged to determine that a field may be primary key field if the field does not contain more than one null value or empty value. In some embodiments, this test may be modified by altering the number of null valued entries (e.g., the threshold value) that may trigger an affirmative result. In some embodiments, the model object field attribute collection may include an attribute indicating the number of null-valued field value/entries of the model object field (and its corresponding data object field). Accordingly, in one or more of the various embodiments, the relation discovery engine may rely on number of null values attribute rather than directly analyzing the underlying data object field values.

In one or more of the various embodiments, the relation discovery engine may be arranged to determine that a field may be primary key field if the field does not include free text (e.g., descriptions, narratives, notes, or the like). In some embodiments, the whitespace frequency threshold value that may trigger an affirmative result may be defined using configuration information. In some embodiments, the model object field attribute collection may include an attribute indicating the data-type (e.g., text) of the model object field (and its corresponding data object field). Accordingly, in one or more of the various embodiments, the relation discovery engine may rely on this data-type attribute rather than directly analyzing the underlying data object field values.

In one or more of the various embodiments, the relation discovery engine may be arranged to determine that a field may be primary key field if the field does not include floating point numbers. In some embodiments, the model object field may include an attribute indicating that the data-type (e.g., float) of the model object field (and its corresponding data object field). Accordingly, in one or more of the various embodiments, the relation discovery engine may rely on this data-type attribute rather than directly analyzing the underlying data object field values.

In one or more of the various embodiments, the relation discovery engine may be arranged to determine that a field may be primary key field if the field does not include duplicate values. In some embodiments, the model object field attribute collection may include attributes indicating the number of entries in the field and an attribute indicating the cardinality of the field. Accordingly, in one or more of the various embodiments, the relation discovery engine may use its attributes collection rather than directly analyzing the underlying data object field values. For example, for a given model object field, the number of duplicates may be determined by subtracting the number of entries from the cardinality. For example, if a data object field has 2,500 entries and a cardinality of 2,500, there each entry in the data object field may considered unique. Likewise, for example, if a data object field has 2,500 entries and a cardinality of 2,000, there may be 500 duplicate entries in the data object field. Note, in this operation that cardinality attribute is a value representing the count of unique entries in a field rather than the actual set of unique entries. One of ordinary skill in the art will appreciate that rather than relying on brute force counting, cardinality values may be determined using algorithms such as HyperLogLog, or the like, that may reduce the computational or memory resources required to compute the cardinality of sets that contain very many items.

In one or more of the various embodiments, as described above, an attributes engine may be arranged to analyze one or more data objects in one or more data sets to determine the one or more attributes that may be included in model objects. Thus, if the attributes are available in the model object or model object field the relation discovery engine may be arranged to use the attributes if applying these comparisons or tests rather than relying directly on the underlying data objects.

In one or more of the various embodiments, if each of the null value test, the data-type tests, and the duplicate tests indicate the model object field may be a primary key field, the relation discovery engine may consider the field a primary key field for the current model object (and its corresponding data object). However, in some embodiments, the relation discovery engine may be configured to require more or fewer affirmative results to qualify a field as a potential primary key field. Accordingly, in some embodiments, if the relation discovery engine may be producing a number of false positive results that exceed a defined threshold, the relation discovery engine may be re-configured to employ less restrictive qualifiers. For example, if just one of the above tests are used to discover primary key fields, the number of false positives may exceed a defined threshold. Thus, in this example, the relation discovery engine may be configured to require more affirmative results (from more tests) before indicating that a field may be a primary key field.

Likewise, in one or more of the various embodiments, one or more configurable values (e.g., threshold values) in the individual tests may be adjusted if a number of false positive results exceed as defined threshold. For example, in the number-of-null test described above, if the number of false positives exceed a defined threshold value, the minimum number of null values may be reduced.

Also, in one or more of the various embodiments, the tests used by a relation discovery engine may be determined to produce a number of false negative results (e.g., failing to identify actual primary key fields). Accordingly, in some embodiments, the relation discovery engine may be re-configured to reduce the requirements, such as, reducing the number of required affirmative test results, modifying one or more threshold values to make tests more inclusive, or the like, or combination thereof.

Further, in one or more of the various embodiments, because some of the determinations or tests used by the relation discovery engine may be based on attribute values provide by an attribute engine, configuration information used by the attributes engine, such as threshold values, may be modified to reduce false positive results or reduce false negative results.

For example, in some embodiments, data-type attributes for model object fields may be provided by an attribute engine based on analysis of the entries in the corresponding data object fields. Thus, for example, if the frequency of whitespace is used for determining if a field is a text field, frequency of whitespace may be measured by dividing the number of whitespace characters by non-whitespace characters, a threshold value may be defined to determine if the field is a text field rather than a integer, float, date, address, or the like. Accordingly, in some embodiments, if the number of text fields being misidentified exceeds a defined threshold, the threshold values used to determine a text field may be modified.

Accordingly, in one or more of the various embodiments, if a relation discovery engine discovers a potential primary key field, that model object field may be tagged or otherwise marked to indicate that it may be a primary key field. Note, the identified fields are considered potential primary key fields since a user may override primary key field determinations.

At decision block 1206, in one or more of the various embodiments, if the model object field may be a primary key field, control may flow to block 1208; otherwise, control may be returned to a calling process.

At block 1208, in one or more of the various embodiments, the relation discovery engine may be arranged to indicate that the model object field may be a primary key field. In one or more of the various embodiments, the indication that the model object field may be a primary key field also indicates that the data object field that corresponds to the model object field may be a primary key field. Next, in some embodiments, control may be returned to a calling process.

Figure 13:
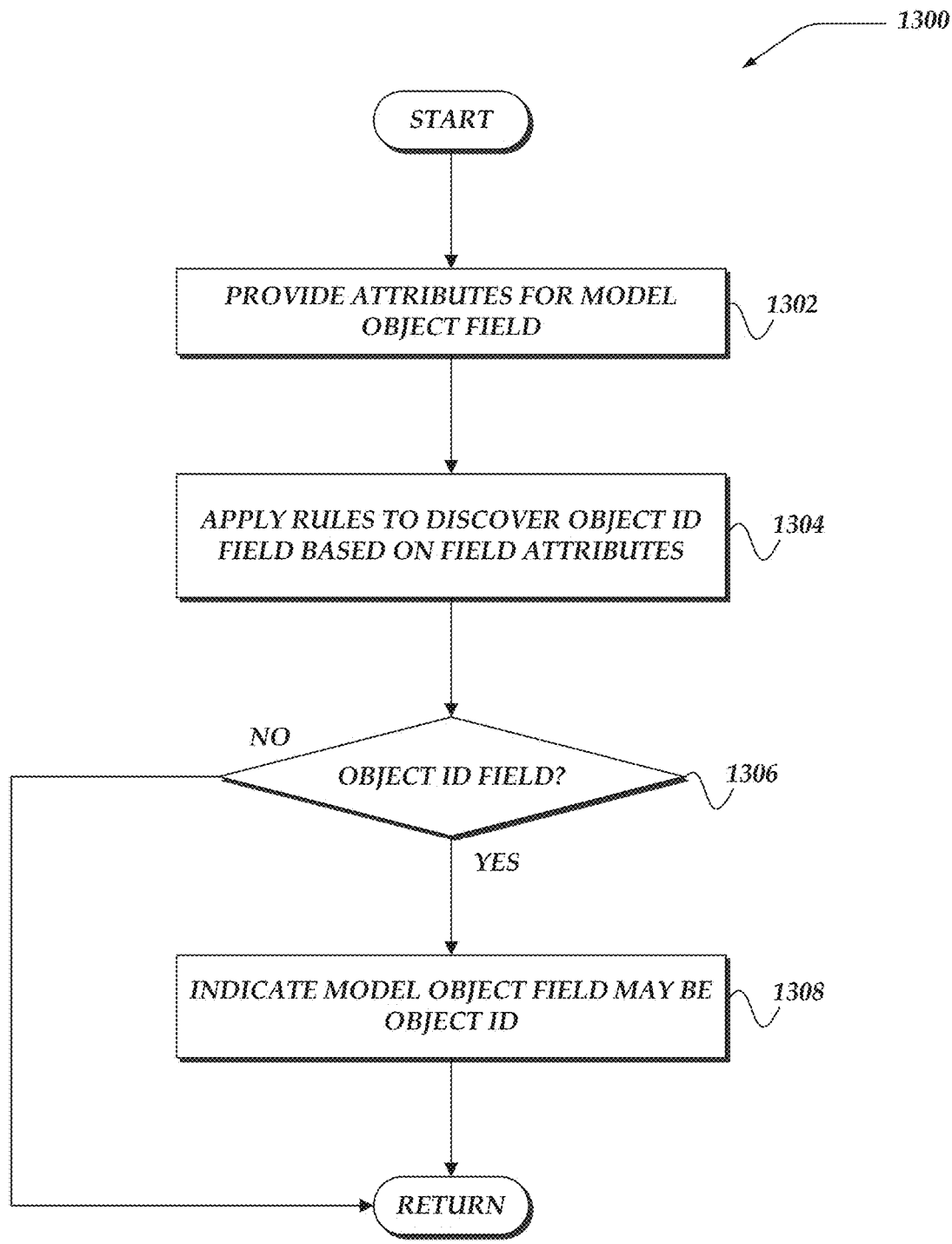
FIG. 13 illustrates a flowchart for a process for discovering object identity fields for machine-assisted key discovery and relation generation in accordance with one or more of the various embodiments.

FIG. 13 illustrates an overview flowchart for process 1300 for discovering object identity fields for machine-assisted key discovery and relation generation in accordance with one or more of the various embodiments. In one or more of the various embodiments, process 1300 describes a process for determining if a provided model object field may be a potential object identity field. After a start block, at block 1302, in one or more of the various embodiments, an attribute collection for a model object field may be provided to a relation discovery engine.

At block 1304, in one or more of the various embodiments, the relation discovery engine may be arranged to apply one or more tests to discover if the model object field may correspond to an object identity field of a data object.

In one or more of the various embodiments, the relation discovery engine may be arranged to execute one or more tests to assess if a model object field may correspond to an object identity field of a data object. In one or more of the various embodiments, the particular tests may be determined based on configuration information. Further, in some embodiments, the relation discovery engine may be arranged to apply various variables for tuning the methods. In some embodiments, the configurable variables may be provided from configuration information. In some embodiments, the configuration information may include threshold values, patterns (e.g., regular expressions, wildcards, or the like), script portions, references/links to other software modules or computer libraries, or the like, or combination thereof.

In one or more of the various embodiments, an object identity field may be considered similar to row identity field such as used in databases. Accordingly, in one or more of the various embodiments, object identity fields may be auto-generated by a database or other source of a dataset. Typically object identity fields may be the numbers 1 to N, where N is the number of entries in the data object field (or some variation thereof). In some cases, these fields may appear to be primary key fields, but often may be just auto-generated row/id numbers.

Accordingly, in one or more of the various embodiments, the relation discovery engine may be arranged to execute one or more tests to discover object identity fields so they may be excluded from being automatically classified as primary key fields.

In one or more of the various embodiments, the relation discovery engine may be arranged to assess if the entries of the data object field are non-null and have data-types that may be interpreted as integers. As noted, in one or more of the various embodiments, model object field attributes may be employed to conduct this assessment rather than directly assessing the underlying data object field entries.

In one or more of the various embodiments, the relation discovery engine may be arranged to assess if the maximum entry value of the field may be near the total number of entries for the field. In some embodiments, "near" may be a threshold value defined using configuration information. In some embodiments, this threshold value may set to one. In other embodiments, the threshold value may increase. Nevertheless, this test is based on the assumption that there may a close relationship between the maximum object identity field value and the number of entries for field in a given data object. As noted, in one or more of the various embodiments, model object field attributes may be employed to conduct this assessment rather than directly assessing the underlying data object field entries.

In one or more of the various embodiments, the relation discovery engine may be arranged to assess if the minimum entry value of the field may be near 0 or 1. In some embodiments, "near" may be a threshold value defined using configuration information. In some embodiments, this threshold value may set to a range such as, 2>N. In other embodiments, the threshold value may be increased. Nevertheless, this test is based on the assumption that values for object identity field values typically start at o or 1 and increment by one from the start. As noted, in one or more of the various embodiments, model object field attributes may be employed to conduct this assessment rather than directly assessing the underlying data object field entries.

In one or more of the various embodiments, the relation discovery engine may be arranged to assess if there may be duplicate entries in the field (in the data object). Accordingly, in some embodiments, by comparing the model object field's cardinality attribute value to the number of entries attribute value for the field. Thus, if the comparison indicates that the number of duplicates exceeds a defined threshold value, the relation discovery engine may consider the field to be a potential object identity field. In some embodiments, the threshold value may be defined using configuration information. In some embodiments, uniqueness of field values may be expressed by computing a ratio of the cardinality value to the number of entries in a field. Accordingly, perfect uniqueness would correspond to a 1:1 ratio (e.g., 1.00). However, because for large number of field entries, cardinality values may be computed using statistical methods, a threshold value may be defined such that if the ratio value exceeds the threshold, the relation discovery engine may conclude that the field may be considered to have sufficient uniqueness. For example, a minimum cardinality ratio threshold value of 0.90 may be defined. Thus, a field with a cardinality of value of 95 and a number of entries of 100 would have a ratio value that exceeds the threshold because 0.95 is greater than 0.90. In contrast, a field with a cardinality value of 80 and a number of entries of 100 has a ratio value that does not exceed the minimum threshold because 0.80 is less the 0.90. In some embodiments, the minimum cardinality ratio value may be adjusted to be more inclusive (e.g., allowing less uniqueness) by lowering the value. Whereas, the minimum cardinality ratio value may be adjusted to be less inclusive (e.g., requiring more uniqueness) by increasing the value.

As noted previously, in one or more of the various embodiments, model object field attributes may be employed to conduct this assessment rather than directly assessing the underlying data object field entries.

In one or more of the various embodiments, if each of the above tests (e.g., non-null/integer test, max entry test, min entry test, and duplicate test) indicate that the model object field may be an object identity field, the relation discovery engine may consider the field to be an object identity field for the current model object (and its corresponding data object).

Further, in some embodiments, the configuration variations/tuning operations discussed above for the primary key field tests may be considered to apply similarly to the tests for determining if a field may be an object identity field, with respect selecting tests, threshold values, configuration values, or the like. However, the tests, threshold values, configuration values, or the like, may relate to discovering object identity fields rather than just primary key fields. (See, FIG. 12 at block 1204.)

At decision block 1306, in one or more of the various embodiments, if the provided model object field may correspond to an object identity field, control may flow to block 1308; otherwise, control may be returned to a calling process.

At block 1308, in one or more of the various embodiments, the relation discovery engine may be arranged to indicate that the model object field may be an object identity field. In one or more of the various embodiments, the indication that the model object field may be an object identity field also indicates that the data object field that corresponds to the model object field may be an object identity field. Next, in one or more of the various embodiments, control may be returned to a calling process.

Figure 14:
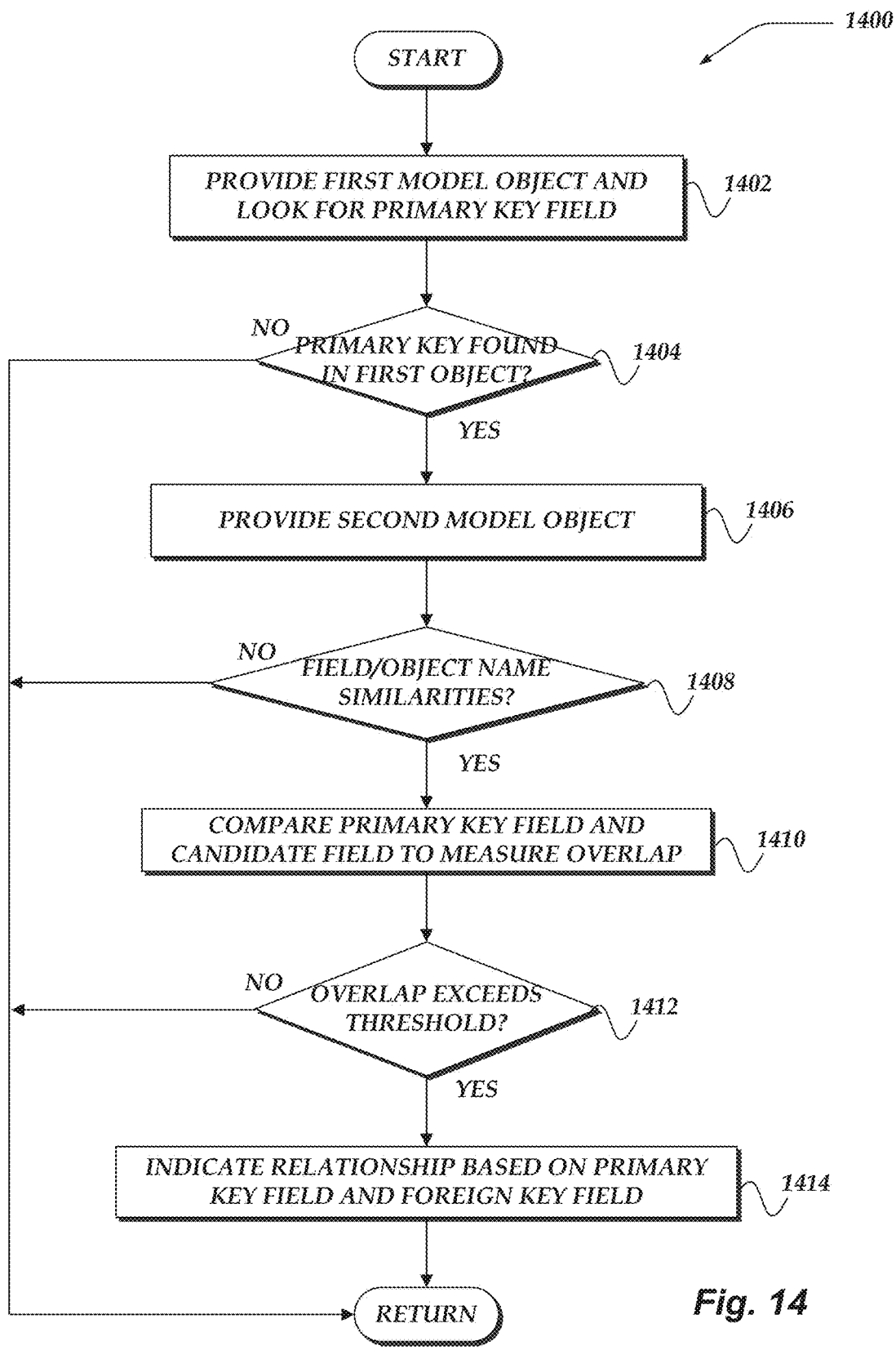
FIG. 14 illustrates a flowchart for a process for discovering relations between data objects based on analysis of model objects in accordance with one or more of the various embodiments.

FIG. 14 illustrates a flowchart for process 1400 for discovering relations between data objects based on analysis of model objects in accordance with one or more of the various embodiments. In one or more of the various embodiments, process 1400 determines if there may be a relationship between the provided model objects. In one or more of the various embodiments, a relation discovery engine may be arranged to take two model objects and iteratively analyze them field by field to discover if there may be a relationship based on the fields of the first model object that the fields of the second model object. If a relationship may be discovered, the relationship may be considered to apply to the underlying data objects that correspond to the model objects.

After a start block, at block 1402, in one or more of the various embodiments, a first model object may be provided to a relation discovery engine. In one or more of the various embodiments, the relation discovery engine may analyze the model object fields of the first model object to identify potential primary key fields. (See, FIG. 12.)

At decision block 1404, in one or more of the various embodiments, if a potential primary key field may be found in the first object, control may flow to block 1406; otherwise, control may be returned to a calling process. In some embodiments, if the first object does not have a primary key field, it may be a fact object rather that an internal object or leaf object. (Notwithstanding user override that may occur later.)

At block 1406, in one or more of the various embodiments, a second model object may be provided to the relation discovery engine. In one or more of the various embodiments, the relation discovery engine may be arranged to iteratively process the selected model objects, two at a time, to discover relationships.

At decision block 1408, in one or more of the various embodiments, if a field name or object name of the second model object may be similar to the field name of the primary key field of the first model object, control may flow to block 1410; otherwise, control may be returned to a calling process.

In one or more of the various embodiments, the relation discovery engine may be arranged to perform one or more tests to determine if there may be similarities in the names of the two objects or field names that may indicate that there may be a relationship.

In one or more of the various embodiments, the relation discovery engine may be arranged to compare the similarity of the field name of the primary key field of first model object field to the field names of the second model object. In some embodiments, the relation discovery engine may be arranged to perform one or more tests that compare the primary key field name to each field name of the second model object.

In one or more of the various embodiments, tests may include, assessing string similarity; edit distance similarity; similarity after splitting the name strings on camel case or underscores; similarity of one field's name to the other's object name; modified Jaccard similarity; similarity metrics after stemming; or the like.

In one or more of the various embodiments, if one or more of the assessments produce an affirmative result, it may indicate that there may be a relationship that may require additional consideration. For example, if a model object field name is discovered to be similar to another model object's name, the model object field having the field name that is similar to the other model object's name might be a foreign key field.

At block 1410, in one or more of the various embodiments, the primary key field of the first model object may be compared to the candidate foreign key field to measure the overlap of entry values. The overlap test is based on the assumption that foreign key field entries are expected to be included in their corresponding primary key field. In one or more of the various embodiments, the relation discover engine may be arranged to measure overlap of two fields by comparing the bloom filter bit-vectors of the two fields to each other. In one or more of the various embodiments, overlap may be measured by analyzing the number of overlapping non-zero entries in the two bit-vectors.

At decision block 1412, in one or more of the various embodiments, if the overlap value exceeds a defined threshold, control may flow to block 1414; otherwise, control may be returned to a calling process. In one or more of the embodiments, if the first model object field is a primary key field that is associated with a foreign key field in the second model object, it may be anticipated that all or most of the foreign key field entries of the second object may match the primary key field entries of the first object. Note, ideally, all entries in a foreign key field may be expected to match entries in its corresponding primary key field. However, in one or more of the various embodiments, the overlap test may be arranged allow for some misses to account for data errors or approximations.

For example, referring to FIG. 8 and FIG. 5, bloom filter 802 and bloom filter 806 may be attributes associated model object fields. In this example, the model object fields are based on field 510 of data object 502 and field 518 of data object 504. Accordingly, if bit-vector 804 and bit-vector 808 are compared to test for overlap, each non-zero bit in bit-vector 804 matches a non-zero bit in bit vector 808, indicating that the entries in field 510 of data object 502 are a subset of the entries of field 518 of data object 504. Thus, in some embodiments, in this example, field 510 of data object 502 is a likely foreign key field that is related to field 518 of data object 504 which may be a primary key field.

In contrast, for example, again referring to FIG. 8 and FIG. 5, bloom filter 810 and bloom filter 814 may be attributes associated model object fields. Here, in this example, the model object fields are based on field 508 of data object 502 and field 526 of data object 506. Accordingly, if bit-vector 812 and bit-vector 816 are compared for overlap, some non-zero bits in bit-vector 812 are unmatched by non-zero bits in bit vector 816 (e.g., bit 12 does not match because the value 1007 is not an entry in field 526), indicating that the entries in field 508 of data object 502 are a super-set of the entries of field 526 of data object 506. Thus, in some embodiments, in this example, field 508 of data object 502 may be considered unlikely to be a foreign key field corresponding to field 526 of data object 506 which may be a primary key field.

Accordingly, in one or more of the various embodiments, a threshold value may be defined to establish the overlap criteria. Similar to other defined threshold values, the overlap threshold value may be defined using configuration information. Accordingly, if too many false positives are occurring, a user may modify the overlap threshold value to require closer overlap (e.g., a more complete overlap). Likewise, in some embodiments, to reduce the number of false negatives, the overlap threshold value may be increased to allow less overlap. For example, in some embodiments, a threshold value that requires perfect overlap may be defined as 0 meaning all of the non-zero bits in one vector (e.g., the foreign key field) are non-zero bits in the other vector (e.g., the primary key field). Increasing the threshold value to 2, would allow two (or fewer) non-zero bits in a vector to be unmatched in the other vector.

Alternatively, in one or more of the various embodiments, the overlap test may comprise computing a ratio of the number of overlapping non-zero entries in the bloom filter bit vector for one field and the number of non-zero entries in the bloom filter vector for the other field.

Accordingly, in some embodiments, the relation discovery engine may be arranged to provide a value representing the fraction of the number of non-zero value in the bloom filter bit vector associated with the candidate foreign key field that are matched by non-zero values in the bloom filter bit vector associated with the candidate primary key field.

In the ideal case, all the entries in a foreign key field will be included in its corresponding primary key field resulting in a fraction value of one (1). However, a threshold value between 0-1.00, such as 0.95, may be defined for testing overlap because in production environments there may be an expectation of some discrepancies or occasional data errors. For example, in some embodiments, the attribute engine may be arranged to employ sketch algorithms that provide reasonable and sufficient approximations for large sets of data rather than exact results. Thus, in some embodiments, threshold value tests may be preferred rather than requiring perfect matches.

At block 1414, in one or more of the various embodiments, the relation discovery engine may indicate that a relation based on the primary key field of the first model object and the foreign key field of the second model object. In one or more of the various embodiments, the indication that the first and second model object field may be part of a relation also indicates that the data object field that corresponds to the model object field may be part of the relation. Next, in one or more of the various embodiments, control may be returned to a calling process.

Figure 15:
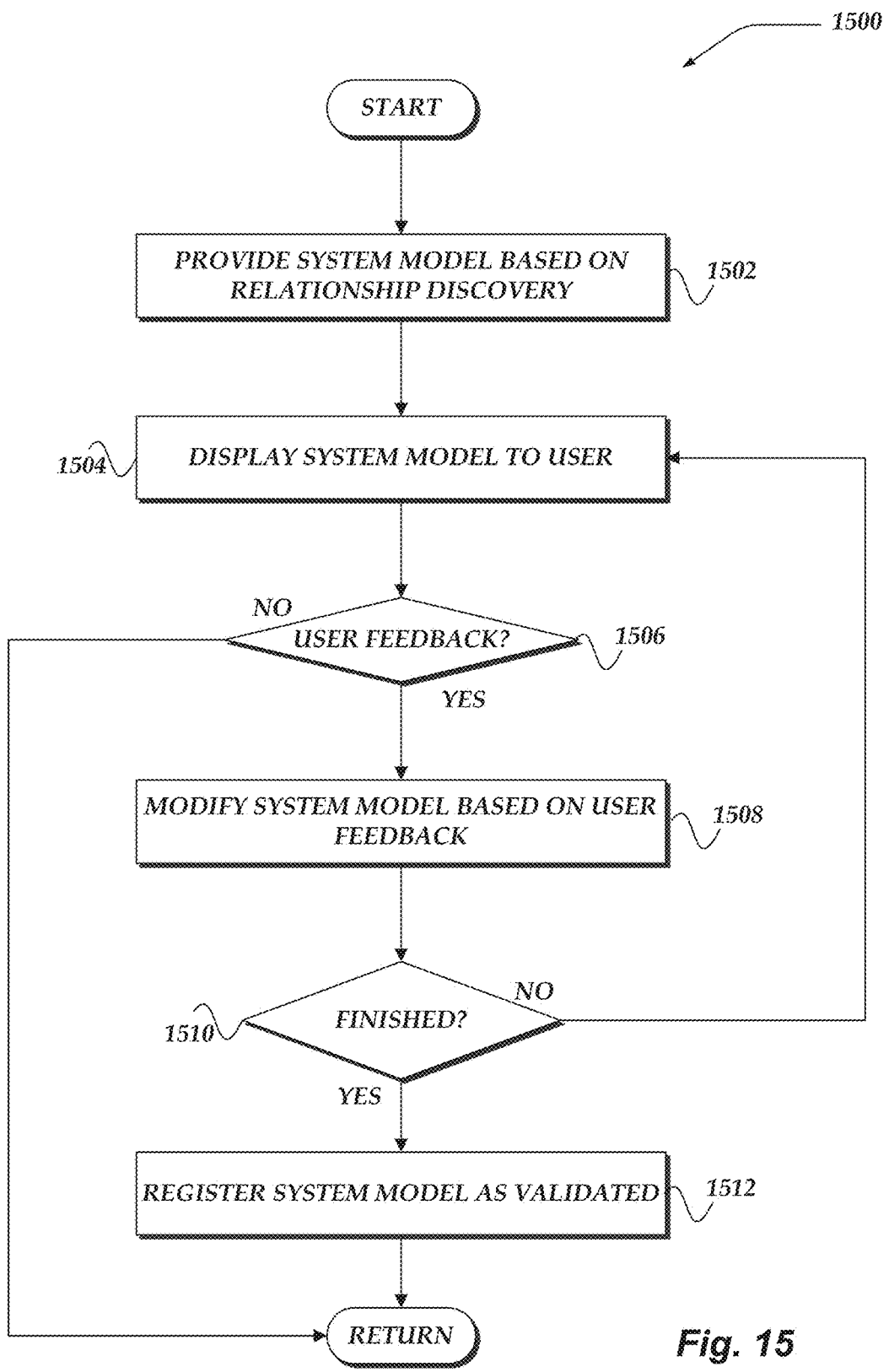
FIG. 15 illustrates a flowchart for a process for providing system models to users based on relations between data objects in accordance with one or more of the various embodiments.

FIG. 15 illustrates a flowchart for process 1500 for providing system models to users based on relations between data objects in accordance with one or more of the various embodiments. After a start block, at block 1502, in one or more of the various embodiments, a modeling platform may provide a system model based on relationship discovery. As described above, a relation discovery engine may be arranged to assess the model objects to determine, fact objects, internal objects, leaf objects, and the relationships between them. In one or more of the various embodiments, the system model is representation of the structure and relationship that has been discovered. In one or more of the various embodiments, system models may be represented using a graph data structure such that the nodes of the graph are the objects (e.g., data objects) discovered from a dataset. And, the relationships are directed edges that point from data objects with primary key fields to objects with corresponding foreign key fields.

At block 1504, in one or more of the various embodiments, the system model may be displayed to a user. In one or more of the various embodiments, a relation discovery engine may be arranged to provide the system model to an application that may display the system model on a hardware display. In some embodiments, the system model may be displayed in an interactive user-interface. In some embodiments, the user-interface may be arranged to enable a user to view the potential fact objects, internal objects, leaf objects, and relations discovered by the relation discovery engine. Further, in one or more of the various embodiments, the user-interface may be arranged to enable the user to select various objects and relations to view and compare the attributes used by the relation discovery engine.

At decision block 1506, in one or more of the various embodiments, if the user provides feedback related to the system model, control may flow to block 1508; otherwise, control may flow to a calling process. In one or more of the various embodiments, the user-interface may enable the user to alter, modify, or override discoveries made by the relation discovery engine. For example, the user may add or remove relations, add or remove objects from the system model, reclassify objects, adjust attribute values, or the like, or combination thereof.

At block 1508, in one or more of the various embodiments, the system model may be modified based on the user feedback. In one or more of the various embodiments, the relation discovery engine may be arranged to re-assess the model objects taking into account the user feedback. For example, if a user removes a relation, or indicates that a discovered potential primary key field is not a primary key field, the relation discovery engine may be arranged to explicitly exclude that field from being matched with potential foreign key fields, or the like.

At decision block 1510, in one or more of the various embodiments, if the user is finished providing feedback about the system model, control may flow to block 1512; otherwise, control may loop back to block 1504. Accordingly, in one or more of the various embodiments, the relation discovery engine may enable a user to engage in an interactive process where the relation discovery engine presents candidate system models, until the user indicates their satisfaction with the system model.

At block 1512, in one or more of the various embodiments, the system model may be registered as validated. In one or more of the various embodiments, the relation discovery engine may be arranged to indicate that the system model has been validated and may be provided for general use by the modeling platform. Next, in some embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing data over a network by using one or more processors, included in one or more network computers, to perform actions, comprising:
    instantiating an attribution engine to perform further actions, including:
        analyzing one or more attributes of one or more model object fields of a plurality of model objects; and
        employing the analysis of the one or more attributes that provides one or more primary key fields in the one or more model objects of the plurality of model objects to perform further actions, including:
            comparing one or more characteristics of the one or more primary key fields with one or more characteristics of one or more other model objects; and
            employing one or more results of the comparison that indicate that one or more foreign key fields are in the one or more other model objects to perform further actions, including:
                instantiating a relation discovery engine to perform further actions, comprising:
                    providing one or more relationships that associate the one or more primary key fields with the one or more foreign key fields; and
                    providing a system model for display that is based on the one or more relationships and the one or more model objects that include the one or more primary key fields and the one or more other model objects that include the one or more foreign key fields, wherein a designation of each provided relationship for each model object is automatically associated with each data object that corresponds to each model object, and wherein the designated relationships include one or more of fact, system, internal or leaf; and
    employing geolocation information from a Global Positioning System (GPS) device at a client computer to determine one or more features that are included in a display of the system model to a user to improve the user's understanding, wherein the features include one or more of time zones, languages, currencies, or calendar formatting based on a particular geo-location of the client computer employed by the user.

2. The method of claim 1, wherein indicating that the one or more foreign key fields are in the one or more other model objects, further comprises, indicating the one or more foreign key fields based on one or more of, a number of null entries remaining below a defined threshold, a conformance to one or more defined data types, or a ratio of a cardinality value to a number of field entries exceeding a defined threshold value.

3. The method of claim 1, wherein providing the one or more primary key fields further comprises, providing the one or more primary key fields based on one or more of, a number of null entries remaining below a defined threshold, a conformance to one or more defined data types, or a ratio of a cardinality value to a number of field entries exceeding a defined threshold value.

4. The method of claim 1, wherein comparing the one or more characteristics of the one or more primary keys with the one or more characteristics of the one or more other model objects further comprises:
comparing a similarity of a field name of the one or more primary key fields to a name of one or more model object fields of the one or more other model objects; and
comparing the similarity of a field name of one or more fields of the one or more other model objects to a field name of the one or more primary key fields.

5. The method of claim 1, wherein comparing the one or more characteristics of the one or more primary keys with the one or more characteristics of the one or more other model objects further comprises:
comparing a bloom filter bit-vector of one or more candidate foreign key fields to a bloom filter bit-vector of the one or more primary key fields; and
when a fraction of non-zero entries in the bloom filter bit-vector of the one or more candidate foreign key fields matched by non-zero entries in the bloom filter bit-vectors of the one or more primary key fields exceeds a defined threshold value, providing an affirmative result to indicate that the one or more candidate foreign key fields are foreign key fields.

6. The method of claim 1, further comprising when a first model object field and a second model object field of a model object are disqualified from being primary key fields, designating the model object as a fact object, wherein a data object that corresponds to the model object is designated as the fact object of the system model.

7. The method of claim 1, further comprising:
displaying the system model in a user interface of an application on a hardware display to enable a user to provide feedback for the system model; and
when the user provides feedback for the system model, updating the system model based on the provided feedback.

8. The method of claim 1, further comprising:
when a model object includes at least one primary key field and at least one foreign key field, designating the model object as an internal object, wherein a data object that corresponds to the model object is designated as an internal object of the system model; and
when the model object includes at least one primary key field absent any foreign key fields, designating the model object as a leaf object, wherein a data object that corresponds to the model object is designated as a leaf object of the system model.

9. A system for managing data, comprising:
a network computer, comprising:
a transceiver that communicates over the network;
a memory that stores at least instructions; and
one or more processor devices that execute instructions that perform actions, including:
instantiating an attribution engine to perform further actions, including:
analyzing one or more attributes of one or more model object fields of a plurality of model objects; and
employing the analysis of the one or more attributes that provides one or more primary key fields in the one or more model objects of the plurality of model objects to perform further actions, including:
comparing one or more characteristics of the one or more primary key fields with one or more characteristics of one or more other model objects; and
employing one or more results of the comparison that indicate that one or more foreign key fields are in the one or more other model objects to perform further actions, including:
instantiating a relation discovery engine to perform further actions, comprising:
providing one or more relationships that associate the one or more primary key fields with the one or more foreign key fields; and
providing a system model for display that is based on the one or more relationships and the one or more model objects that include the one or more primary key fields and the one or more other model objects that include the one or more foreign key fields, wherein a designation of each provided relationship for each model object is automatically associated with each data object that corresponds to each model object, and wherein the designated relationships include one or more of fact, system, internal or leaf; and
employing geolocation information from a Global Positioning System (GPS) device at a client computer to determine one or more features that are included in a display of the system model to a user to improve the user's understanding, wherein the features include one or more of time zones, languages, currencies, or calendar formatting based on a particular geo-location of the client computer employed by the user; and
the client computer, comprising:
a client computer transceiver that communicates over the network;
a client computer memory that stores at least instructions; and
one or more processor devices that execute instructions that perform actions, including:
displaying one or more portions of the system model on a display of the client computer.

10. The system of claim 9, wherein indicating that the one or more foreign key fields are in the one or more other model objects, further comprises, indicating the one or more foreign key fields based on one or more of, a number of null entries remaining below a defined threshold, a conformance to one or more defined data types, or a ratio of a cardinality value to a number of field entries exceeding a defined threshold value.

11. The system of claim 9, wherein the one or more network computer processor devices execute instructions that perform actions, further comprising, providing the one or more primary key fields based on one or more of, a number of null entries remaining below a defined threshold, a conformance to one or more defined data types, or a ratio of a cardinality value to a number of field entries exceeding a defined threshold value.

12. The system of claim 9, wherein comparing the one or more characteristics of the one or more primary keys with the one or more characteristics of the one or more other model objects further comprises:

comparing a similarity of a field name of the one or more primary key fields to a name of one or more model object fields of the one or more other model objects; and comparing the similarity of a field name of one or more fields of the one or more other model objects to a field name of the one or more primary key fields.

13. The system of claim 9, wherein comparing the one or more characteristics of the one or more primary keys with the one or more characteristics of the one or more other model objects further comprises:

comparing a bloom filter bit-vector of one or more candidate foreign key fields to a bloom filter bit-vector of the one or more primary key fields; and when a fraction of non-zero entries in the bloom filter bit-vector of the one or more candidate foreign key fields matched by non-zero entries in the bloom filter bit-vectors of the one or more primary key fields exceeds a defined threshold value, providing an affirmative result to indicate that the one or more candidate foreign key fields are foreign key fields.

14. The system of claim 9, wherein the one or more network computer processor devices execute instructions that perform actions, further comprising when a first model object field and a second model object field of a model object are disqualified from being a primary key field, designating the model object as a fact object, wherein a data object that corresponds to the model object is designated as the fact object of the system model.

15. The system of claim 9, wherein the one or more network computer processor devices execute instructions that perform actions, further comprising:

displaying the system model in a user interface of an application on a hardware display to enable a user to provide feedback for the system model; and when the user provides feedback for the system model, updating the system model based on the provided feedback.

16. The system of claim 9, wherein the one or more network computer processor devices execute instructions that perform actions, further comprising:

when a model object includes at least one primary key field and at least one foreign key field, designating the model object as an internal object, wherein a data object that corresponds to the model object is designated as an internal object of the system model; and when the model object includes at least one primary key field absent any foreign key fields, designating the model object as a leaf object, wherein a data object that corresponds to the model object is designated as a leaf object of the system model.

17. A processor readable non-transitory storage media that includes instructions for managing data, wherein execution of the instructions by one or more hardware processors performs actions, comprising:

instantiating an attribution engine to perform further actions, including:

analyzing one or more attributes of one or more model object fields of a plurality of model objects; and employing the analysis of the one or more attributes that provides one or more primary key fields in the one or more model objects of the plurality of model objects to perform further actions, including:

comparing one or more characteristics of the one or more primary key fields with one or more characteristics of one or more other model objects; and employing one or more results of the comparison that indicate that one or more foreign key fields are in the one or more other model objects to perform further actions, including:

instantiating a relation discovery engine to perform further actions, comprising:

providing one or more relationships that associate the one or more primary key fields with the one or more foreign key fields; and providing a system model for display that is based on the one or more relationships and the one or more model objects that include the one or more primary key fields and the one or more other model objects that include the one or more foreign key fields, wherein a designation of each provided relationship for each model object is automatically associated with each data object that corresponds to each model object, and wherein the designated relationships include one or more of fact, system, internal or leaf; and employing geolocation information from a Global Positioning System (GPS) device at a client computer to determine one or more features that are included in a display of the system model to a user to improve the user's understanding, wherein the features include one or more of time zones, languages, currencies, or calendar formatting based on a particular geo-location of the client computer employed by the user.

18. The media of claim 17, wherein indicating that the one or more foreign key fields are in the one or more other model objects, further comprises, indicating the one or more foreign key fields based on one or more of, a number of null entries remaining below a defined threshold, a conformance to one or more defined data types, or a ratio of a cardinality value to a number of field entries exceeding a defined threshold value.

19. The media of claim 17, wherein providing the one or more primary key fields, further comprises, providing the one or more primary key fields based on one or more of, a number of null entries remaining below a defined threshold, a conformance to one or more defined data types, or a ratio of a cardinality value to a number of entries exceeding a defined threshold value.

20. The media of claim 17, wherein comparing the one or more characteristics of the one or more primary keys with the one or more characteristics of the one or more other model objects further comprises:

comparing a similarity of a field name of the one or more primary key fields to a name of one or more model object fields of the one or more other model objects; and comparing the similarity of a field name of one or more fields of the one or more other model objects to a field name of the one or more primary key fields.

21. The media of claim 17, wherein comparing the one or more characteristics of the one or more primary keys with the one or more characteristics of the one or more other model objects further comprises:

comparing a bloom filter bit-vector of one or more candidate foreign key fields to a bloom filter bit-vector of the one or more primary key fields; and when a fraction of non-zero entries in the bloom filter bit-vector of the one or more candidate foreign key fields matched by non-zero entries in the bloom filter bit-vectors of the one or more primary key fields exceeds a defined threshold value, providing an affirmative result to indicate that the one or more candidate foreign key fields are foreign key fields.

22. The media of claim 17, further comprising when a first model object field and a second model object field of a model object are disqualified from being a primary key field, designating the model object as a fact object, wherein a data object that corresponds to the model object is designated as the fact object of the system model.

23. The media of claim 17, further comprising:
displaying the system model in a user interface of an application on a hardware display to enable a user to provide feedback for the system model; and
when the user provides feedback for the system model, updating the system model based on the provided feedback.

24. A network computer for managing data, comprising:
a transceiver that communicates over the network;
a memory that stores at least instructions; and
one or more processor devices that execute instructions that perform actions, including:
  instantiating an attribution engine to perform further actions, including:
    analyzing one or more attributes of one or more model object fields of a plurality of model objects; and
    employing the analysis of the one or more attributes that provides one or more primary key fields in the one or more model objects of the plurality of model objects to perform further actions, including:
      comparing one or more characteristics of the one or more primary key fields with one or more characteristics of one or more other model objects; and
      employing one or more results of the comparison that indicate that one or more foreign key fields are in the one or more other model objects to perform further actions, including:
        instantiating a relation discovery engine to perform further actions, comprising:
          providing one or more relationships that associate the one or more primary key fields with the one or more foreign key fields; and
          providing a system model for display that is based on the one or more relationships and the one or more model objects that include the one or more primary key fields and the one or more other model objects that include the one or more foreign key fields, wherein a designation of each provided relationship for each model object is automatically associated with each data object that corresponds to each model object, and wherein the designated relationships include one or more of fact, system, internal or leaf; and
  employing geolocation information from a Global Positioning System (GPS) device at a client computer to determine one or more features that are included in a display of the system model to a user to improve the user's understanding, wherein the features include one or more of time zones, languages, currencies, or calendar formatting based on a particular geo-location of the client computer employed by the user.

25. The network computer of claim 24, wherein indicating that the one or more foreign key fields are in the one or more other model objects, further comprises, indicating the one or more foreign key fields based on one or more of, a number of null entries remaining below a defined threshold, a conformance to one or more defined data types, or a ratio of a cardinality value to a number of field entries exceeding a defined threshold value.

26. The network computer of claim 24, wherein providing the one or more primary keys fields, further comprises, providing the one or more primary key fields based on one or more of, a number of null entries remaining below a defined threshold, a conformance to one or more defined data types, or a ratio of a cardinality value to a number of field entries remaining exceeding a defined threshold value.

27. The network computer of claim 24, wherein comparing the one or more characteristics of the one or more primary keys with the one or more characteristics of the one or more other model objects further comprises:
  comparing a similarity of a field name of the one or more primary key fields to a name of one or more model object fields of the one or more other model objects; and
  comparing the similarity of a field name of one or more fields of the one or more other model objects to a field name of the one or more primary key fields.

28. The network computer of claim 24, wherein comparing the one or more characteristics of the one or more primary keys with the one or more characteristics of the one or more other model objects further comprises:
  comparing a bloom filter bit-vector of one or more candidate foreign key fields to a bloom filter bit-vector of the one or more primary key fields; and
  when a fraction of non-zero entries in the bloom filter bit-vector of the one or more candidate foreign key fields matched by non-zero entries in the bloom filter bit-vectors of the one or more primary key fields exceeds a defined threshold value, providing an affirmative result to indicate that the one or more candidate foreign key fields are foreign key fields.

29. The network computer of claim 24, further comprising:
  displaying the system model in a user interface of an application on a hardware display to enable a user to provide feedback for the system model; and
  when the user provides feedback for the system model, updating the system model based on the provided feedback.

30. The network computer of claim 24, further comprising:
  when a first model object field of a model object is disqualified from being a primary key field, designating the model object as a fact object, wherein a data object that corresponds to the model object is designated as the fact object of the system model;
  when a model object includes at least one primary key field and at least one foreign key field, designating the model object as an internal object, wherein a data object that corresponds to the model object is designated as an internal object of the system model; and
  when the model object includes at least one primary key field absent any foreign key fields, designating the model object as a leaf object, wherein a data object that corresponds to the model object is designated as a leaf object of the system model.

* * * * *